(12) United States Patent
Kotanigawa et al.

(10) Patent No.: US 11,329,445 B2
(45) Date of Patent: May 10, 2022

(54) OPTICAL AMPLIFIER, OPTICAL TRANSMISSION SYSTEM, AND OPTICAL CABLE FAILURE PART MEASUREMENT METHOD

(71) Applicant: Nippon Telegraph and Telephone Corporation, Tokyo (JP)

(72) Inventors: Takashi Kotanigawa, Tokyo (JP); Kohei Saito, Tokyo (JP); Tsutomu Kubo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/973,927

(22) PCT Filed: Jun. 6, 2019

(86) PCT No.: PCT/JP2019/022592
§ 371 (c)(1),
(2) Date: Dec. 10, 2020

(87) PCT Pub. No.: WO2019/244660
PCT Pub. Date: Dec. 26, 2019

(65) Prior Publication Data
US 2021/0257803 A1    Aug. 19, 2021

(30) Foreign Application Priority Data

Jun. 18, 2018  (JP) .............................. JP2018-115136

(51) Int. Cl.
*H04B 10/07* (2013.01)
*H01S 3/067* (2006.01)
(Continued)

(52) U.S. Cl.
CPC ....... *H01S 3/06754* (2013.01); *H04B 10/071* (2013.01); *H04B 10/077* (2013.01);
(Continued)

(58) Field of Classification Search
CPC ................ H01S 3/06754; H01S 3/0672; H04J 14/0201; H04B 10/071; H04B 10/077;
(Continued)

(56) References Cited

U.S. PATENT DOCUMENTS 5,144,125 A * 9/1992 Carter .................... G01K 11/06
250/227.15
5,214,728 A * 5/1993 Shigematsu ......... H04B 10/038
385/24

(Continued)

FOREIGN PATENT DOCUMENTS

JP    2003-134089    5/2003
JP    2004-228813    8/2004
(Continued)

OTHER PUBLICATIONS

Lai et al, Novel Supervisory Technique Using Wavelength Division Multiplexed OTDR, Mar. 1994, IEEE, All Document. (Year: 1994).*
(Continued)

*Primary Examiner* — Dibson J Sanchez
(74) *Attorney, Agent, or Firm* — Fish & Richardson P.C.

(57) ABSTRACT

A fault location in an optical cable at a long distance is easily measured and detected with low-cost equipment in a configuration in which an isolator is disposed in the vicinity of an optical amplifier for improved optical transmission performance and for stabilization. An optical amplifier has a configuration in which multiplexing/demultiplexing units as first WDM filters and that multiplex/demultiplex main signal light and OTDR light and (measurement light) for submarine cable fault measurement transmitted to a submarine cable in opposite directions from a transmission device side and a reception device side, transmit the multiplexed/demultiplexed main signal light to a main path passing through an isolators and an EDF, and transmit the multiplexed/demultiplexed OTDR light to a bypass path bypassing the
(Continued)

isolators and the EDF are included on both sides of a set of the isolators and the EDF of the submarine cable.

18 Claims, 18 Drawing Sheets

(51) Int. Cl.
*H04B 10/071* (2013.01)
*H04B 10/077* (2013.01)
*H04J 14/02* (2006.01)
*H04B 10/29* (2013.01)

(52) U.S. Cl.
CPC ......... *H04J 14/0201* (2013.01); *H01S 3/0672* (2013.01); *H04B 10/07* (2013.01); *H04B 10/29* (2013.01)

(58) Field of Classification Search
CPC ...... H04B 10/07; H04B 10/29; H04B 10/294; G01M 11/00
USPC .......................... 398/9–38, 173–181
See application file for complete search history.

(56) References Cited

U.S. PATENT DOCUMENTS

| | | | | |
|---|---|---|---|---|
| 6,310,718 | B1* | 10/2001 | Saeki | G01M 11/3154 |
| | | | | 356/73.1 |
| 6,369,883 | B1* | 4/2002 | Clark | G01N 21/59 |
| | | | | 250/228 |
| 6,377,393 | B1* | 4/2002 | Saeki | H04B 10/291 |
| | | | | 359/341.2 |
| 10,411,796 | B1* | 9/2019 | Archambault | H04B 10/07951 |
| 10,432,302 | B1* | 10/2019 | Delgado | G01M 11/3154 |
| 2003/0081285 | A1 | 5/2003 | Shimojoh | |
| 2005/0078905 | A1 | 4/2005 | Kakui et al. | |
| 2005/0111788 | A1 | 5/2005 | Tsuyama | |
| 2005/0206998 | A1* | 9/2005 | Ito | H04B 10/2916 |
| | | | | 359/333 |
| 2005/0271384 | A1* | 12/2005 | Lee | H04B 10/071 |
| | | | | 398/13 |
| 2006/0238746 | A1* | 10/2006 | Rosolem | H04B 10/071 |
| | | | | 356/73.1 |
| 2007/0077067 | A1* | 4/2007 | Wellbrock | H04L 43/0847 |
| | | | | 398/45 |
| 2008/0165348 | A1* | 7/2008 | Kim | G01M 11/333 |
| | | | | 356/73.1 |
| 2016/0197673 | A1* | 7/2016 | McClean | G01M 11/3154 |
| | | | | 398/38 |
| 2017/0126316 | A1* | 5/2017 | Yuan | H04B 10/70 |
| 2017/0294757 | A1 | 10/2017 | Rapp | |
| 2018/0123687 | A1* | 5/2018 | Chang | H04B 10/0771 |

FOREIGN PATENT DOCUMENTS

| | | |
|---|---|---|
| JP | 2005-159586 | 6/2005 |
| JP | 2005-192056 | 7/2005 |
| JP | 2005-277370 | 10/2005 |
| JP | 2010-258884 | 11/2010 |
| JP | 2015-15660 | 1/2015 |

OTHER PUBLICATIONS

Maeda et al., "Ultra-long-span 500km 16 x 10 Gbit/s WDM unrepeatered transmission using RZ-DPSK format," Electronics Letters, Jan. 6, 2005, 41(1):2 pages.

* cited by examiner

OPTICAL AMPLIFIER, OPTICAL TRANSMISSION SYSTEM, AND OPTICAL CABLE FAILURE PART MEASUREMENT METHOD

CROSS-REFERENCE TO RELATED APPLICATIONS

This application is a National Stage application under 35 U.S.C. § 371 of International Application No. PCT/JP2019/022592, having an International Filing Date of Jun. 6, 2019, which claims priority to Japanese Application Serial No. 2018-115136, filed on Jun. 18, 2018. The disclosure of the prior application is considered part of the disclosure of this application, and is incorporated in its entirety into this application.

TECHNICAL FIELD

The present invention relates to an optical amplifier that is used in a long-distance submarine cable system or the like and performs amplification of signal light transmitted to an optical cable, an optical transmission system, and an optical cable fault location measurement method.

BACKGROUND ART

In the related art, when a fault location such as a disconnection is detected in a long-distance optical cable using an optical fiber, an optical time domain reflectometer (OTDR) measurement device is connected to an end of the optical cable and the detection is performed as follows. An optical pulse signal (also referred to as OTDR light) is transmitted from the OTDR measurement device to a partner side and return light reflected through reflection in the optical cable in response to this transmission is received for measurement and detection of the fault location. In this measurement, because a distance of the optical cable is seen from a reciprocation time (a transmission and reception time) of light according to the OTDR light and return light, a distance to a fault location can be detected using a reciprocation time when the return light stops returning. To further explain, optical power of the received return light decreases as the reciprocation time increases (the distance increases), but when the optical power sharply decreases at a certain point in time, a point in time at which this decrease occurs is a fault position of the optical cable.

FIG. 16 is a block diagram illustrating an example of a configuration of a rear excitation type remote excitation submarine transmission system as an optical transmission system using a remote excitation optical amplifier based on rear excitation of the related art.

A remote excitation submarine transmission system (also referred to as a "system") 10 has a configuration in which a transmission side optical transmission device (also referred to as a transmission device) 11 and a reception side optical transmission device (also referred to as a reception device) 12 are connected by a submarine cable 13 based on an optical cable. Hereinafter, a direction from the transmission device 11 to the reception device 12 is referred to as a forward direction, and a direction opposite to the forward direction is referred to as a reverse direction.

An erbium-doped fiber (EDF) 14 is interposed (inserted) in the submarine cable 13 as an optical amplifier. The EDF 14 excites erbium ions in an optical fiber core through introduction of excitation light 16 transmitted in the reverse direction with respect to the main signal light 15 transmitted from the transmission device 11, and amplifies the main signal light 15. The EDF 14 is inserted at a position close to the reception device 12 in order to supplement, through amplification, attenuation of the main signal light 15 occurring as the main signal light 15 becomes farther from the transmission device 11. A transmission device 11 side of the EDF 14 is referred to as a front side, and a reception device 12 side of the EDF 14 is referred to as a rear side.

The transmission device 11 includes a plurality of transponders 21a to 21n that relay signal light from communication devices (not shown), a multiplexer/demultiplexer 22, and an optical amplifier 23. The multiplexer/demultiplexer 22 multiplexes the signal light relayed by the transponders 21a to 21n. The optical amplifier 23 amplifies the main signal light 15 multiplexed by the multiplexer/demultiplexer 22 and transmits the amplified main signal light 15 to the submarine cable 13.

The reception device 12 includes an optical amplifier 25, a multiplexer/demultiplexer 26, and a plurality of transponders 27a to 27n. The optical amplifier 25 amplifies the main signal light 15 received from the submarine cable 13. The multiplexer/demultiplexer 26 demultiplexes the main signal light 15 and outputs the demultiplexed signal light 15 to the transponders 27a to 27n. The transponders 27a to 27n relay the demultiplexed signal light to a communication device (not shown).

An OTDR measurement device (also referred to as a measurement device) 32a on the transmission side is connected to the submarine cable 13 via a demultiplexing coupler 31a disposed near the transmission side of the transmission device 11, and an OTDR measurement device 32b on the reception side is connected via a demultiplexing coupler 31b disposed near the reception side of the reception device 12. Further, an excitation light transmission device 34 is connected to the reception device 12 side relative to the demultiplexing coupler 31b on the reception side of the submarine cable 13 via a multiplexing/demultiplexing coupler 33. By transmitting the excitation light 16 from the excitation light transmission device 34 on the rear side to the EDF 14, the main signal light 15 is amplified by the EDF 14.

In such a configuration, the main signal light 15 transmitted from the transmission device 11 to the submarine cable 13 is amplified by the EDF 14 and received by the reception device 12. In this case, when the main signal light 15 cannot be appropriately received by the reception device 12, measurement of a fault location (fault measurement) such as a disconnection of the submarine cable 13 is performed.

The fault measurement is performed using the measurement device 32b on the reception side while introducing the excitation light 16 into the EDF 14 from the rear side, in addition to the measurement device 32a on the transmission side, such that the fault measurement is performed in all of the submarine cable 13. In this case, the OTDR light 35a is transmitted from the measurement device 32a on the transmission side to the reception device 12 side of the submarine cable 13 via the demultiplexing coupler 31a, and thus the fault measurement is performed between the demultiplexing coupler 31a on the transmission device 11 side and the vicinity of the front side of the EDF 14, as indicated by a bi-directional arrow Y1.

For example, the measurement device 32a detects a distance to a fault location of the submarine cable 13 on the basis of a time difference between a time when the return light reflected through reflection in the submarine cable 13 in response to transmission of the OTDR light 35a cannot be appropriately received and a time when the OTDR light 35a is transmitted to the submarine cable 13.

On the other hand, OTDR light 35b is transmitted from the measurement device 32b on the reception side to the transmission device 11 side of the submarine cable 13 via the demultiplexing coupler 31b, and thus fault measurement is performed between the demultiplexing coupler 31b on the reception device 12 side and the vicinity of the front side of the EDF 14, as indicated by a bi-directional arrow Y2. When the OTDR light 35b passes through the EDF 14, the excitation light 16 is necessary because the OTDR light 35b is absorbed by the EDF 14 when there is no excitation light 16. By performing the fault measurement from the measurement devices 32a on the front side and 32b on the rear side in this manner, it is possible to perform the measurement in all sections Y1 and Y2 of the submarine cable 13.

This type of technology includes technology described in Patent Literature 1 and Non Patent Literature (NPL) 1.

CITATION LIST

Patent Literature

Patent Literature 1. JP 2010-258884A

Non Patent Literature

NPL 1: H. Maeda, et al., "Ultra-long-span 500 km 16×10 Gbit/s WDM unrepeatered transmission using RZ-DPSK format," Electron. Lett. 6th 2005, Vol. 41, No. 1

SUMMARY OF THE INVENTION

Technical Problem

Incidentally, in the fault measurement of the submarine cable 13 using each of the measurement devices 32a and 32b described above, the fault measurement is performed while the excitation light 16 is introduced into the EDF 14. This introduction enables measurement in the Y2 section up to the vicinity of the front of the EDF 14 because the OTDR light 35b that is measurement light is amplified by the EDF 14 with the excitation light 16.

However, in this case, because the excitation light 16 is used, amplified spontaneous emission (ASE) noise 36a shown in FIG. 17 is generated in the EDF 14. This ASE noise 36a may repeatedly reciprocate before and after the EDF 14, resulting in an oscillation phenomenon. This peak level is a high level of noise and may be observed as noise in a wavelength band around 1533 μm (optical noise 36b) shown in FIG. 17. It is known that transmission properties of the main signal light 15 significantly deteriorate when the optical noise 36b is generated. A wavelength band of the main signal light 15 is 1.5 μm.

When the ASE noise 36a is generated in this manner, the measurement device 32b on the reception side cannot appropriately detect a fault location of the submarine cable 13 in some cases. That is, although the ASE noise 36a is generated when there is the excitation light 16, the ASE noise 36a is also generated at the same wavelength as those of the OTDR light 35a and 35b. Thus, when the ASE noise 36a is generated, the OTDR light 35a and 35b that is measurement light cannot be identified.

Therefore, it is necessary for an expensive and highly sensitive coherent-OTDR (C-OTDR) to be used for the measurement device 32b on the reception side. Even when the ASE noise 36a is input, the C-OTDR removes the ASE noise 36a to enable highly sensitive measurement, but there is a problem that the cost of equipment becomes high due to the expensive C-OTDR. Further, when the excitation light 16 is used for fault measurement in a case in which the excitation light 16 is stopped due to a fault, special work is necessary and the difficulty of measurement work increases. However, when the excitation light 16 is used for fault measurement, it is possible to test an entire submarine transmission section or a wide range of area using the C-OTDR.

For improvement of the transmission properties or stabilization of the main signal light 15, a configuration is conceivable in which the isolator 40 is connected in the vicinity of the front side of the EDF 14 of the submarine cable 13, as in the remote excitation submarine transmission system 10A shown in FIG. 18. The isolator 40 has a function of passing signal light only when the signal light is directed in the forward direction, as indicated by an arrow.

In this case, because the OTDR light 35b from the rear side is blocked by the isolator 40, a cable test range (measurement range) of the measurement device 32b is limited by a position of the EDF 14 indicated by a bi-directional arrow Y4. On the other hand, because the ASE noise 36a does not reciprocate due to the isolator 40, the optical noise 36b due to oscillation is not generated, and transmission properties are improved. However, when the isolator 40 is not disposed in the vicinity of the EDF 14, the oscillation cannot be curbed.

Because of the isolator 40, a measurement range from an OTDR 32b on the reception side is limited by the isolator 40 and measurement to the front vicinity of the EDF 14 cannot be performed. Because of this, it is not necessary to amplify the OTDR light 35b with the excitation light 16 and the ASE noise 36a is not generated because the excitation light 16 is not transmitted, and thus, in the measurement device 32b on the reception side, the fault measurement can be appropriately performed without using a C-OTDR. However, it is necessary for the measurement device 32a on the transmission side to perform measurement to the isolator 40 indicated by a bi-directional arrow Y3.

However, because a distance from the measurement device 32a on the transmission side to the isolator 40 is a long distance, the OTDR light 35a is attenuated and return light 35a1 is also weakened, and thus the return light 35a1 cannot be appropriately received by the measurement device 32a. Thus, there is a problem that this portion of the submarine cable is an area of the submarine cable (optical cable) 13 that cannot be measured. In this case, it is necessary for a highly sensitive C-OTDR capable of long-range measurement to be used, but there is a problem that equipment of the measurement device becomes expensive.

Further, when the isolator 40 is inserted before the EDF 14, the main signal light 15 is amplified by the EDF 14 after being attenuated by the isolator 40, resulting in deterioration of transmission properties, but when the isolator 40 is inserted after the EDF 14, the excitation light 16 from the rear side does not reach the EDF 14. Therefore, the isolator 40 cannot be inserted after the EDF 14.

The present invention has been made in view of such circumstances, and an object of the present invention is to provide an optical amplifier, an optical transmission system, and an optical cable fault location measurement method capable of easily measuring and detecting a fault location in an optical cable at a long distance with low-cost equipment in a configuration in which an isolator is disposed in the vicinity of an optical amplifier for improved optical transmission performance and for stabilization.

Means for Solving the Problem

As a means for solving the above problems, a first aspect of the present invention provides an optical amplifier interposed in an optical cable between a transmission device and a reception device that transmit and receive main signal light and including an isolator configured to pass the main signal light transmitted from the transmission device only in one direction toward the reception device, and an erbium-doped fiber (EDF) configured to amplify the main signal light in response to excitation light, the optical amplifier including a multiplexing/demultiplexing unit on both sides of a set of the isolator and the EDF in the optical cable, the multiplexing/demultiplexing unit multiplexing/demultiplexing the main signal light and measurement light for optical cable fault measurement transmitted from at least one of a front side as a transmission device side and a rear side as a reception device side to the optical cable, transmitting the multiplexed/demultiplexed main signal light to a main path passing through the isolator and the EDF, and transmitting the multiplexed/demultiplexed measurement light to a bypass path bypassing the isolator and the EDF.

With this configuration, because the measurement light passes through the bypass path that bypasses the isolator and the EDF when a fault such as a disconnection has occurred in the optical cable, the measurement of the fault location is performed without passing through the EDF. Therefore, the measurement light from both the transmission and reception sides reaches an intermediate portion of the optical cable, and it is possible to perform fault measurement in the entire area of the optical cable without using excitation light. Thus, ASE noise can be prevented from being generated because excitation light is not used. Therefore, an expensive C-OTDR is unnecessary as a measurement device for transmitting measurement light from both the transmission device side and the reception device side, a typical OTDR is sufficient, and thus a low cost of the optical transmission system is achieved. Therefore, when the optical amplifier of the present invention is used in an optical transmission system, a fault location of a submarine cable at a long distance can be easily measured and detected with low-cost equipment.

A second aspect of the present invention provides the optical amplifier in accordance with the first aspect, wherein the multiplexing/demultiplexing unit is a wavelength division multiplexing (WDM) filter configured to multiplex/demultiplex the main signal light and the measurement light having different wavelengths, transmit the main signal light after multiplexing/demultiplexing to the main path, and transmit the measurement light to the bypass path.

With this configuration, it is possible to constitute the multiplexing/demultiplexing unit with a WDM filter that is a pre-fabricated product, and thus the configuration can be realized at a low cost.

A third aspect of the present invention provides the optical amplifier in accordance with the first aspect, wherein the multiplexing/demultiplexing unit includes a circulator configured to transmit the main signal light or the measurement light from the front side to the rear side via the main path, and transmit the measurement light from the rear side to the front side via the bypass path.

With this configuration, because the multiplexing/demultiplexing unit can be configured by using a circulator that is a pre-fabricated product, the configuration can be realized at a low cost.

A fourth aspect of the present invention provides the optical amplifier in accordance with the third aspect, wherein the measurement light has a wavelength that is the same as or different from the wavelength of the main signal light.

With this configuration, the wavelength of the main signal light is generally 1.5 μm at which loss is the least in the optical cable, and thus, when the measurement light is set to have the same wavelength, the loss can be reduced and a transmission distance can be extended.

A fifth aspect of the present invention provides the optical amplifier in accordance with the first aspect, wherein the isolator is disposed on the front side or the rear side of the EDF.

With this configuration, when the isolator is on the rear side (on the reception device side) of the EDF, the main signal light from the transmission device is directly input to the EDF. Therefore, because the main signal light is not attenuated before amplification, it is possible to improve OSNR properties and improve transmission properties. When the isolator is on the front side (on the transmission device side) of the EDF, excitation light for rear excitation can be input directly to the EDF.

A sixth aspect of the present invention provides the optical amplifier in accordance with the fifth aspect, further including a second multiplexing/demultiplexing unit configured to input the excitation light from the rear side to the EDF while bypassing the isolator when the isolator is disposed on the rear side of the EDF.

With this configuration, even when the isolator is disposed on the rear side of the EDF, excitation light for rear excitation can be input to the EDF while bypassing the isolator.

A seventh aspect of the present invention provides an optical transmission system in which a measurement device that transmits measurement light for performing fault measurement of an optical cable between a transmission device and a reception device that transmit and receive main signal light is included on both sides or any one of the sides of the transmission device and the reception device and connected to the optical cable, wherein the optical amplifier in accordance with any one of the first to the sixth aspect is interposed in an optical cable between the measurement devices included on both sides of the transmission device and the reception device or an optical cable between the transmission device included on any one of both the sides and the transmission device or the reception device.

With this configuration, a fault location of a submarine cable at a long distance can be easily measured and detected with low-cost equipment. Even when the optical transmission system is a submarine transmission system with a repeater, a fault location of a submarine cable can be easily measured and detected with low-cost equipment.

A eighth aspect of the present invention provides an optical transmission system for inserting an optical amplifier in an optical cable between a transmission device and a reception device that transmit and receive main signal light, the optical amplifier including an isolator configured to pass the main signal light transmitted from the transmission device only in one direction toward the reception device, and an EDF configured to amplify the main signal light in response to excitation light, and transmitting measurement light from a measurement device for optical cable fault measurement to measure a fault of the optical cable, wherein a multiplexing/demultiplexing unit configured to multiplex/demultiplex the main signal light and the measurement light, transmit the multiplexed/demultiplexed main signal light to a main path passing through the optical amplifier, and transmit the multiplexed/demultiplexed measurement light to a bypass path bypassing the optical amplifier is included on both sides of the optical amplifier of the optical cable, and the measurement device executes transmitting the measurement light to the optical cable so that the measurement light passes through the bypass path via the multiplexing/demultiplexing unit when the main signal light is unable to be received by the reception device.

According to this method, because the measurement light passes through the bypass path bypassing the EDF between the multiplexing/demultiplexing units on both sides at the time of the occurrence of a fault of the optical cable in which the optical amplifier including the EDF has been interposed, measurement of a fault location can be performed without passing through the EDF. Therefore, the measurement light from both the transmission and reception sides reaches an intermediate portion of the optical cable, and it is possible to perform fault measurement in the entire area of the optical cable without using excitation light. ASE noise can be prevented from being generated because excitation light is not used. Thus, an expensive C-OTDR as a measurement device for transmitting measurement light is unnecessary, and a typical OTDR is sufficient, which makes it possible to achieve a low cost of the optical amplifier. Therefore, when this optical amplifier is used in an optical transmission system, a fault location of a submarine cable at a long distance can be easily measured and detected with low-cost equipment.

Effects of the Invention

According to the present invention, it is possible to provide an optical amplifier, an optical transmission system, and an optical cable fault location measurement method with which a fault location in an optical cable is easily measured and detected at a long distance with low-cost equipment in a configuration in which an isolator is disposed in the vicinity of an optical amplifier for improved optical transmission performance and for stabilization.

DESCRIPTION OF EMBODIMENTS

Embodiments of the present invention will be described below with reference to the drawings. Here, corresponding components throughout all drawings of the present specification are denoted by the same reference signs and description thereof will be omitted appropriately.

Configuration of First Embodiment

Figure 1:
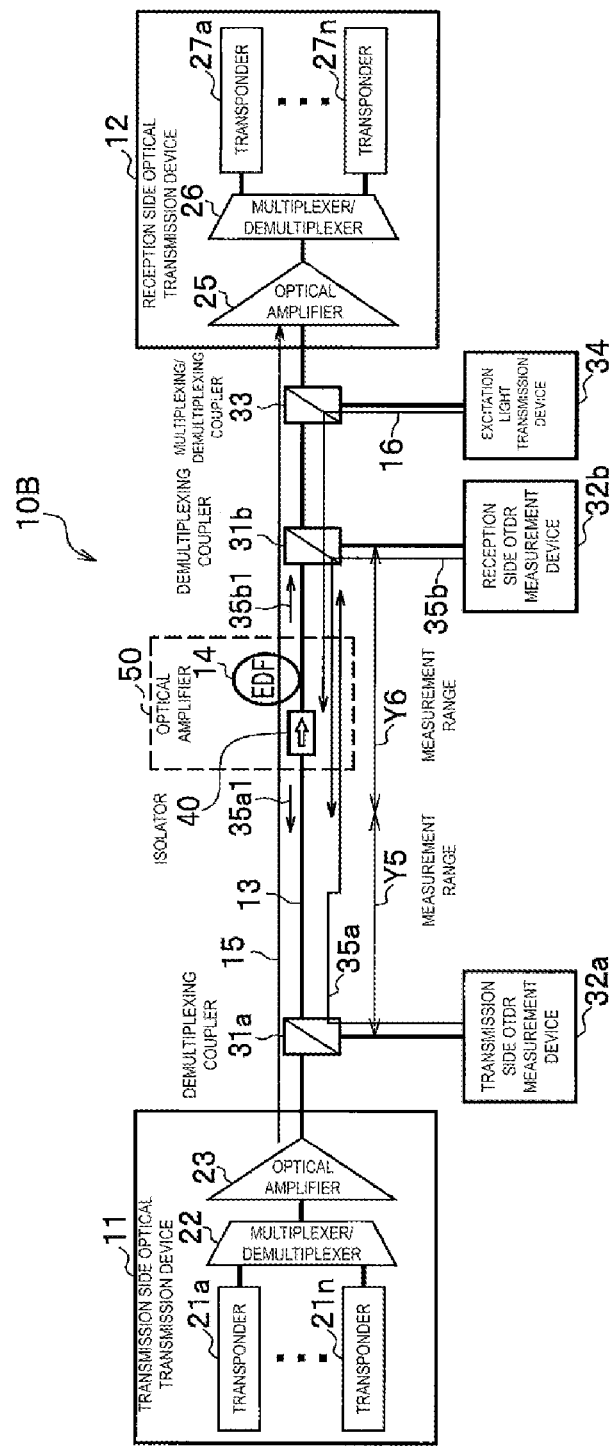
FIG. 1 is a block diagram illustrating a configuration of a rear excitation type remote excitation submarine transmission system as an optical transmission system using a remote excitation optical amplifier based on rear excitation according to a first embodiment of the present invention.

FIG. 1 is a block diagram illustrating a configuration of a rear excitation type remote excitation submarine transmission system (a system) as an optical transmission system using a remote excitation optical amplifier based on rear excitation according to a first embodiment of the present invention.

Figure 18:
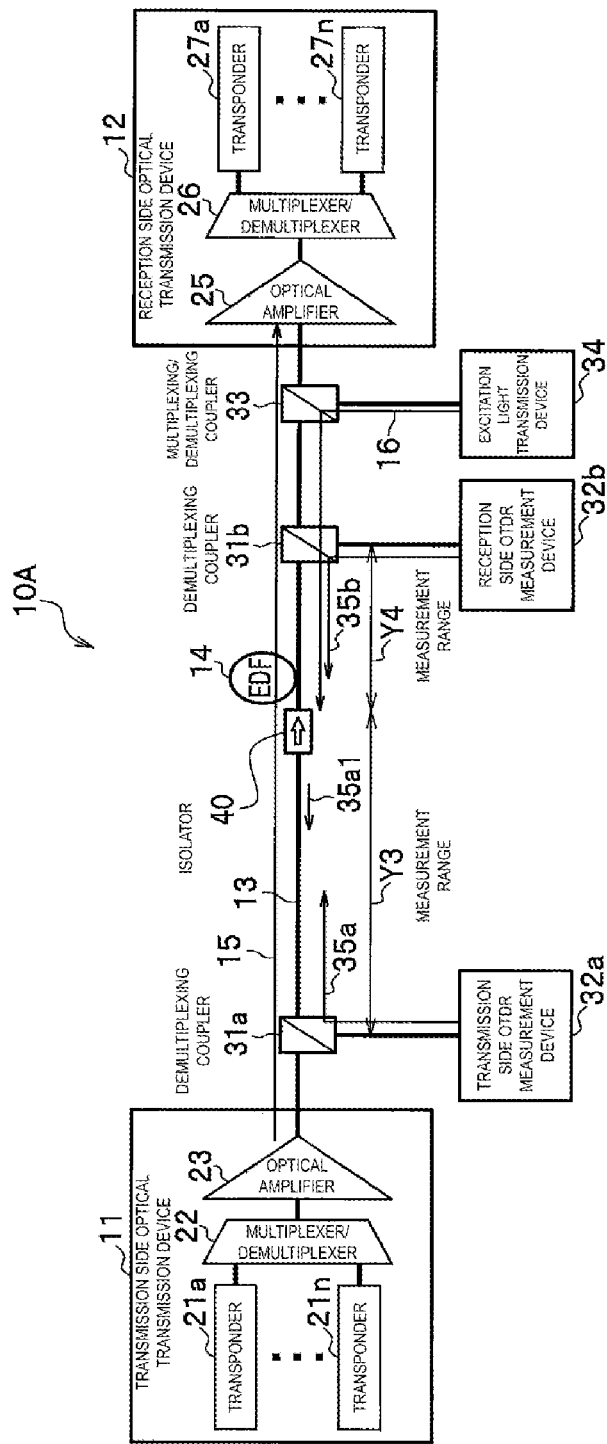
FIG. 18 is a block diagram illustrating a configuration of a rear excitation type remote excitation submarine transmission system as an optical transmission system using a remote excitation optical amplifier based on rear excitation and an isolator of the related art.

A system 10B shown in FIG. 1 is different from the system 10A (FIG. 18) in that an optical amplifier 50 has been interposed (disposed). This optical amplifier 50 has a function of multiplexing/demultiplexing (multiplexing or demultiplexing) main signal light 15 and OTDR light 35a and 35b and passing the light to separate paths. However, for the measurement devices 32a and 32b on both the transmission and reception sides, a typical inexpensive OTDR rather than an expensive and highly sensitive C-OTDR is used.

Figure 16:
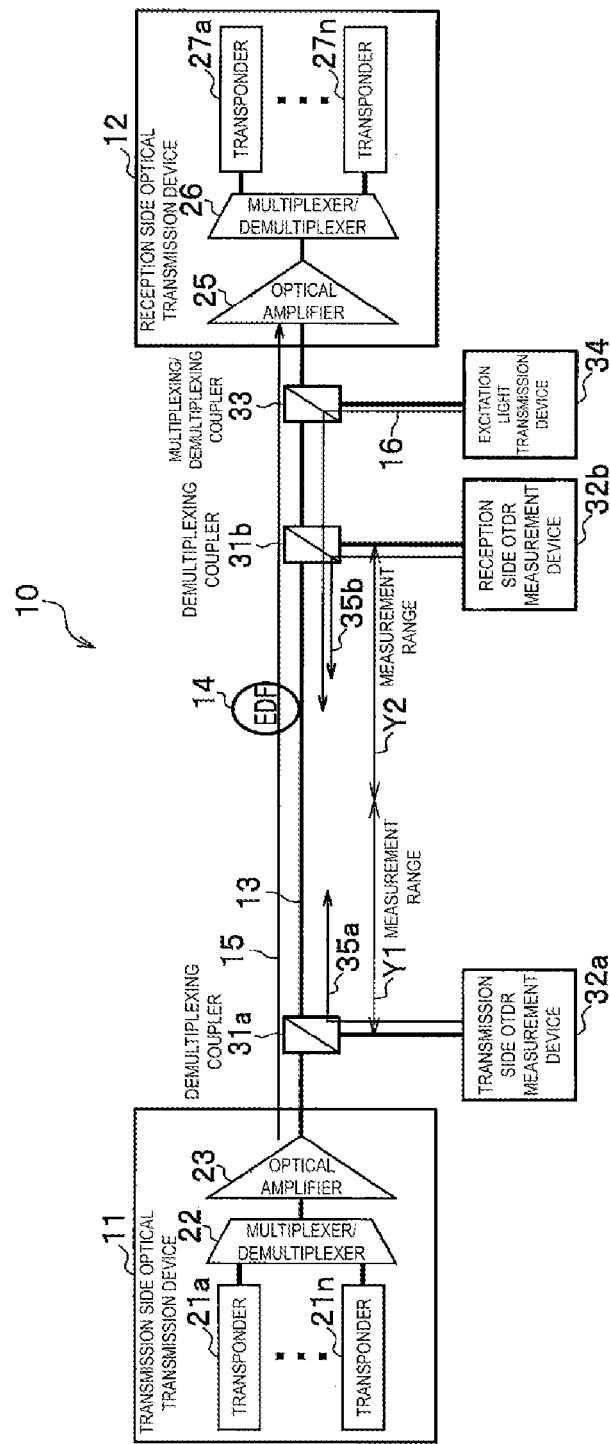
FIG. 16 is a block diagram illustrating a configuration of a rear excitation type remote excitation submarine transmission system as an optical transmission system using a remote excitation optical amplifier based on rear excitation of the related art.

In general, when the submarine cable is short, the OTDR light on the transmission side may reach the optical amplifier, but here it is assumed that the submarine cable is long and measurement only up to a range of Y1 can be performed as in FIG. 16. However, in the following description of the optical amplifier, it is assumed that the submarine cable is short, and the OTDR light from the transmission side and the reception side passes through the optical amplifier.

Figure 2:
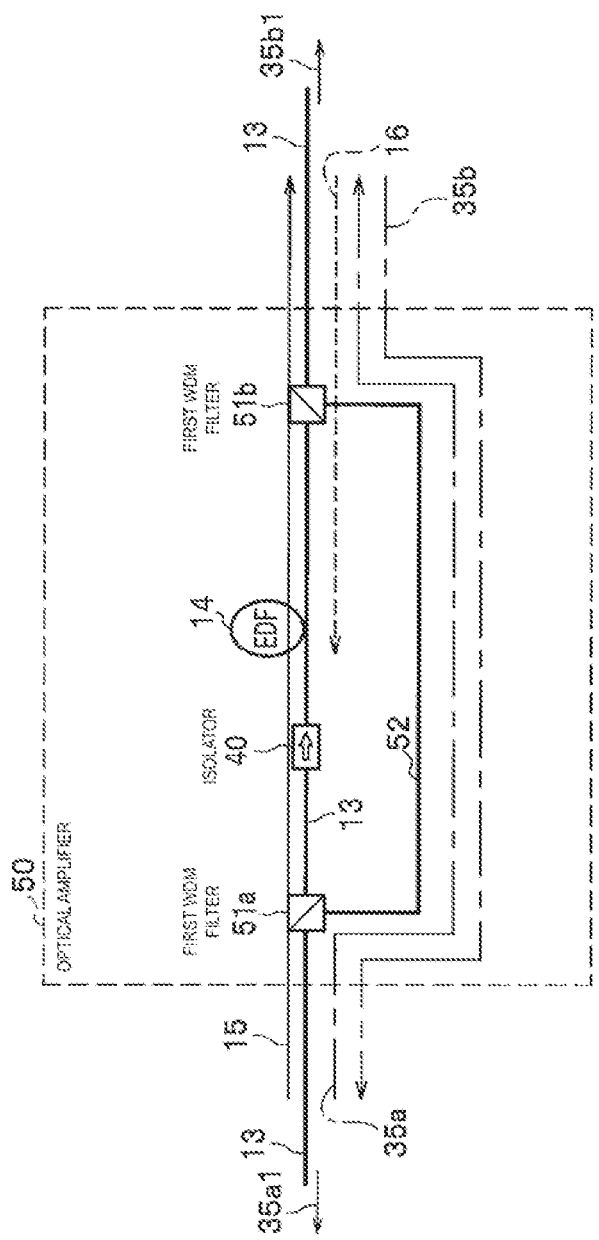
FIG. 2 is a block diagram illustrating a configuration of an optical amplifier used for the remote excitation submarine transmission system of the first embodiment.

The optical amplifier 50 includes an EDF 14 and an isolator 40 interposed in a submarine cable 13, a first wavelength division multiplexing (WDM) filter 51a interposed on the transmission device 11 side (a front side) of the isolator 40, and a first WDM filter 51b interposed on the reception device 12 side (a rear side) of the EDF 14, as shown in FIG. 2. The first WDM filters 51a and 51 b constitute a multiplexing/demultiplexing unit described in aspects of the present invention.

The first WDM filters 51a and 51b are connected to each other in the main path of the submarine cable 13 that connects, via the EDF 14 and the isolator 40, their ports (referred to as main ports) to each other, via which the main signal light 15 is input and output. Further, the first WDM filters 51a and 51b are connected to each other in a bypass path of an optical cable (other optical cable) 52 that directly connects their ports (referred to as subordinate ports) to each other, via which the OTDR light 35a and 35b are input and output, while bypassing the isolators 40 and the EDF 14. The submarine cable 13 between the first WDM filters 51a and 51b is also referred to as a main path 13 and an optical cable 52 is also referred to as a bypass path 52.

The first WDM filters 51a and 51b multiplex/demultiplex signal light having different wavelengths and, in this example, multiplex/demultiplex signal light of 1.5 μm or less and transmit the multiplexed/demultiplexed signal light to the main path 13, and multiplex/demultiplex signal light of 1.6 μm or more and transmit the multiplexed/demultiplexed signal light to the bypass path 52. This wavelength is an example, and the first WDM filters 51a and 51b may be designed so that main signal light 15, OTDR light 35a and 35b, and excitation light 16 can be multiplexed/demultiplexed.

That is, the first WDM filters 51a and 51b multiplex/demultiplex main signal light 15 of 1.5 μm transmitted from the transmission device 11 (FIG. 1) and the OTDR light 35a and 35b of 1.6 μm transmitted from the measurement devices 32a and 32b on both the transmission and reception sides, transmit the main signal light 15 to the main path 13, and transmit the OTDR light 35a and 35b to the bypass path 52. The OTDR light 35a and 35b constitutes measurement light described in aspects of the present invention.

Further, the first WDM filter 51b on the rear side transmits the excitation light 16 of the 1.48 μm transmitted from the excitation light transmission device 34 (FIG. 1) to the front side of the main path 13.

Effects of First Embodiment

Effects of the optical amplifier 50 and effects of the system 10B using the optical amplifier 50 according to the first embodiment will be described.

The optical amplifier 50 is interposed in the submarine cable (the optical cable) 13 that connects the transmission device 11 and the reception device 12 that transmit and receive the main signal light 15. This optical amplifier 50 includes the isolator 40 that passes the main signal light 15 transmitted from the transmission device 11 in only a forward direction (one direction) toward the reception device 12, and a back-excited type EDF 14 that amplifies the main signal light 15 in response to the excitation light 16 transmitted in the opposite direction of the main signal light 15. This optical amplifier 50 has the following characteristic configuration.

The optical amplifier 50 has a configuration in which multiplexing/demultiplexing units as the first WDM filters 51a and 51b that multiplex/demultiplex the main signal light 15 and the OTDR light 35a and 35b (measurement light) for submarine cable fault measurement transmitted to the submarine cable 13 in opposite directions from the front side that is the transmission device 11 side and the rear side that is the reception device 12 side, transmit the multiplexed/demultiplexed main signal light 15 to the main path 13 passing through the isolators 40 and the EDF 14, and transmit the multiplexed/demultiplexed OTDR light 35a and 35b to the bypass path 52 bypassing the isolators 40 and the EDF 14 are included on both sides of a set of the isolators 40 and the EDF 14 of the submarine cable 13.

However, the measurement devices 32a and 32b on both the transmission and reception sides transmit the OTDR light 35a and 35b having a wavelength different from that of the main signal light 15 to the submarine cable 13 in opposite directions, and receive the return light 35a1 and 35b1 of the transmitted OTDR light 35a and 35b caused by reflection in the submarine cable 13 to detect a fault location of the submarine cable 13.

With this configuration, because the OTDR light 35a and 35b passes through the bypass path 52 bypassing the isolators 40 and the EDF 14 between the first WDM filters 51a and 51b when a fault such as a disconnection has occurred in the submarine cable 13, the measurement of the fault location is performed without passing through the EDF 14. Thus, the OTDR light 35a and 35b transmitted in the opposite directions from both the transmission and reception sides can reach an intermediate portion of the submarine cable 13 as indicated by arrows Y5 and Y6 in FIG. 1, and fault measurement in the entire area of the submarine cable 13 can be performed without using the excitation light 16.

Figure 17:
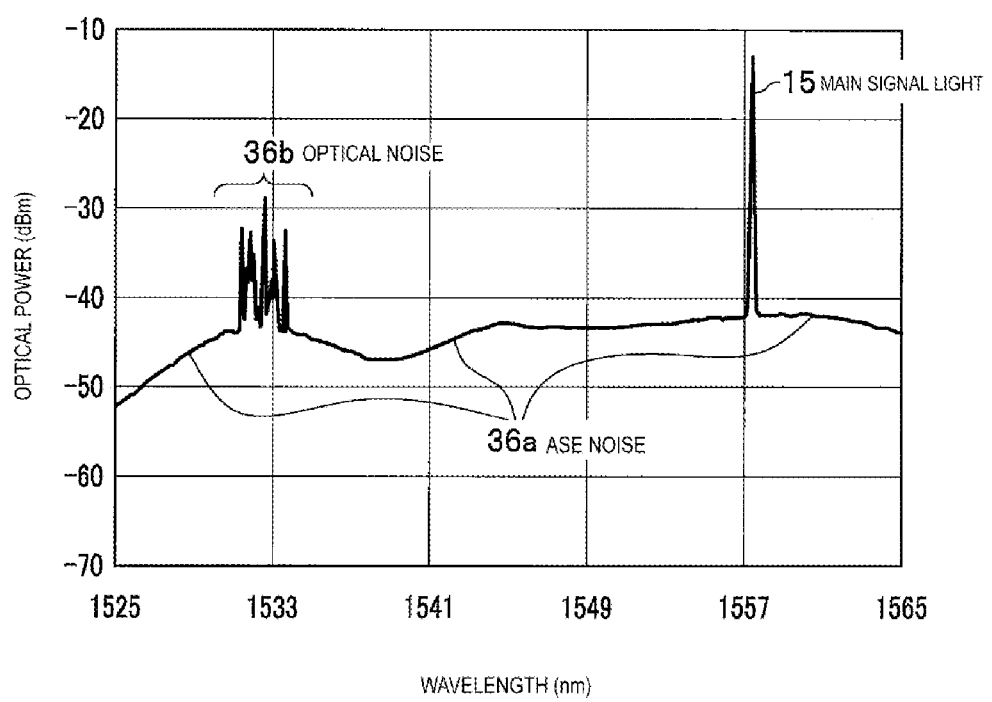
FIG. 17 is a diagram illustrating ASE noise.

Thus, because the amplification of the EDF 14 with the excitation light 16 may be unnecessary, the ASE noise 36 (FIG. 17) as in the related art can be prevented from being generated. Thus, because expensive C-OTDRs are unnecessary as the measurement devices 32a and 32b on both sides and general OTDRs are sufficient, low costs of equipment in the optical transmission system is achieved. Thus, when the optical amplifier 50 is used in the system 10B, it is possible to easily measure and detect the fault location of the submarine cable 13 at a long distance with a low-cost equipment. Further, because the excitation light 16 is not necessary, special work when the excitation light 16 is used is not necessary.

Further, because the isolator 40 is used, the ASE noise 36a (FIG. 17) does not reciprocate, and thus the optical noise 36b due to oscillation is not generated, and transmission properties are improved.

Further, because the fault measurement is performed from the measurement devices 32a and 32b on the front side and the rear side, the measurement can be performed in all sections Y5 and Y6 of the submarine cable 13.

Modification Example 1 of First Embodiment

Figure 3:
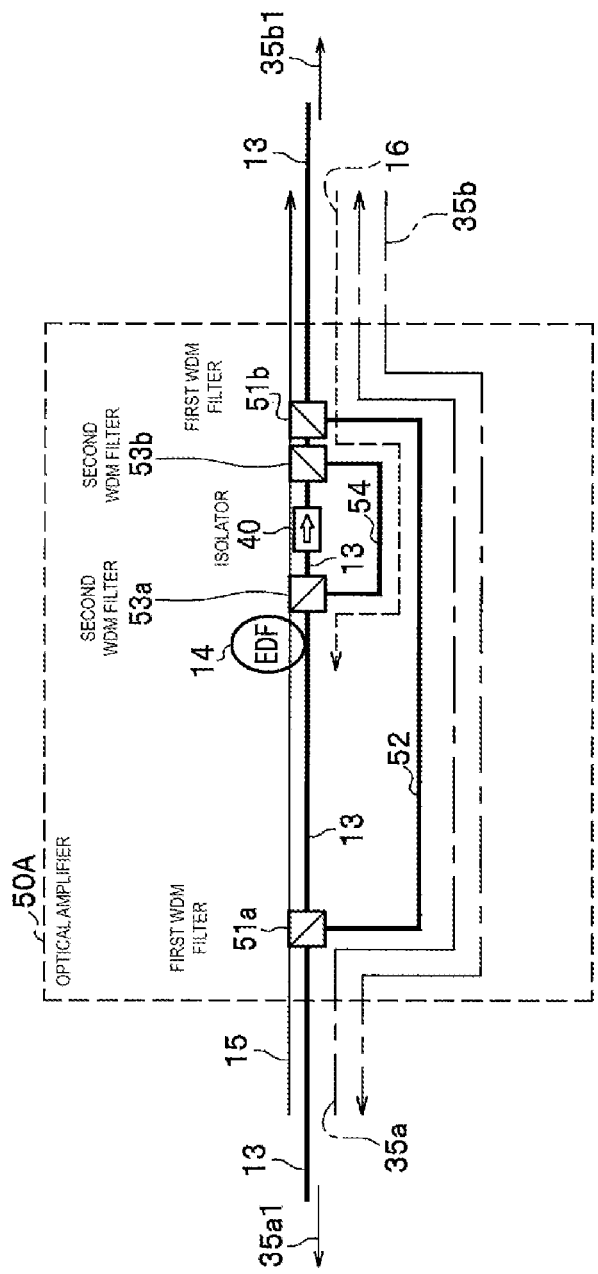
FIG. 3 is a block diagram illustrating a configuration of an optical amplifier according to modification example 1 of the first embodiment.

FIG. 3 is a block diagram illustrating a configuration of an optical amplifier 50A according to modification example 1 of the first embodiment.

The optical amplifier 50A shown in FIG. 3 is different from the optical amplifier 50 described above (FIG. 2) in that an isolator 40 is interposed in the submarine cable 13 on the rear side of the EDF 14, a second WDM filter 53a is interposed in the submarine cable 13 between the EDF 14 and the isolator 40, and a second WDM filter 53*b* is interposed between the isolator 40 and the first WDM filter 51*b* on the rear side.

That is, the second WDM filters (multiplexing/demultiplexing unit) 53*a* and 53*b* on the front and rear sides are disposed on both sides of the isolator 40 such that the excitation light 16 does not pass through the isolator 40.

The second WDM filters 53*a* and 53*b* are connected to each other by two paths including the main path of the submarine cable 13 that connects, via the isolators 40, the main ports to each other, via which the main signal light 15 is input and output, and the bypass path of the optical cable (other optical cable) 54 that directly connects the subordinate ports to each other, via which the excitation light 16 is input and output while bypassing the isolators 40. The submarine cable 13 is also referred to as the main path 13 and an optical cable 54 is also referred to as a bypass path 54.

The second WDM filters 53*a* and 53*b* multiplex/demultiplex the signal light having different wavelengths, and in this example, signal light of 1.48 μm or less and signal light of 1.5 μm or more are multiplexed/demultiplexed as follows. That is, the second WDM filters 53*a* and 53*b* transmit the excitation light 16 that is signal light of 1.48 μm or less to the bypass path 54 and transmit the main signal light 15 to the main path 13.

The first WDM filters 51*a* and 51*b* are disposed before and after the set of the EDF 14, the second WDM filter 53*a* on the front side, the isolator 40, and the second WDM filter 53*b* on the rear side. The first WDM filters 51*a* and 51*b* demultiplex the main signal light 15 of 1.5 μm or less and the excitation light 16 and transmit the light to the main path 13, and demultiplex the OTDR light 35*a* and 35*b* of 1.6 μm or more and transmit the light to the bypass path 52, as described above.

An operation of transmitting signal light in the optical amplifier 50A having such a configuration will be described. First, the excitation light 16 transmitted in the reverse direction from the excitation light transmission device 34 (FIG. 1) on the rear side is demultiplexed to the bypass path 54 while bypassing the isolator 40 by the second WDM filter 53*b* via the first WDM filter 51*b* on the rear side. After this demultiplexing, the light is incident on the EDF 14 via the second WDM filter 53*a* on the front side. This incidence allows the EDF 14 to amplify the main signal light 15.

Then, the main signal light 15 received in the forward direction from the transmission device 11 (FIG. 1) via the submarine cable 13 is demultiplexed to the main path 13 by the first WDM filter 51*a* on the front side and amplified by the EDF 14. This amplified main signal light 15 is transmitted to the reception device 12 (FIG. 1) via the second WDM filter 53*a* on the front side, the isolator 40, the second WDM filter 53*b* on the rear side, and the first WDM filter 51*b*.

Here, when a fault that the reception device 12 cannot receive or cannot appropriately receive the main signal light 15 has occurred, fault measurement of the submarine cable 13 is performed. However, the main signal light 15 is in a blocked state and the excitation light 16 enters a non-transmitted state.

The OTDR light 35*a* from the measurement device 32*a* (FIG. 1) is demultiplexed to the bypass path 52 by the first WDM filter 51*a* on the front side and is transmitted to the rear side of the submarine cable 13 by the first WDM filter 51*b* on the rear side. The return light 35*a*1 according to this transmission is received by the measurement device 32*a* on the transmission side, and the fault measurement of the submarine cable 13 is performed as described above.

On the other hand, the OTDR light 35*b* from the measurement device 32*b* on the reception side (FIG. 1) is demultiplexed to the bypass path 52 by the first WDM filter 51*b* on the rear side and transmitted to the front side of the submarine cable 13 by the first WDM filter 51*a* on the front side. The return light 35*b*1 according to this transmission is received by the measurement device 32*b* on the reception side, and the fault measurement of the submarine cable 13 is performed as described above.

Thus, the OTDR light 35*a* and 35*b* transmitted in the opposite directions from both the transmission and reception sides can reach the intermediate portion of the submarine cable 13 as indicated by arrows Y5 and Y6 in FIG. 1, and it is possible to perform fault measurement in the entire area of the submarine cable 13 without using the excitation light 16. Further, because the excitation light 16 in the reverse direction is caused to bypass the isolator 40 in the forward direction by the second WDM filters 53*a* and 53*b*, the excitation light 16 can be appropriately incident on the EDF 14. Further, because the OTDR light 35*b* from the rear side bypasses the isolator 40, a measurement distance is not limited by the isolator 40.

Further, in the optical amplifier 50A of modification example 1 shown in FIG. 3, because the isolator 40 is on the reception device 12 side (a rear stage side) of the EDF 14, the main signal light 15 from the transmission device 11 is not attenuated by the isolator 40 before amplification. Thus, it is possible to improve optical signal to noise ratio (OSNR) properties and to improve transmission properties.

Modification Example 2 of First Embodiment

Figure 4:
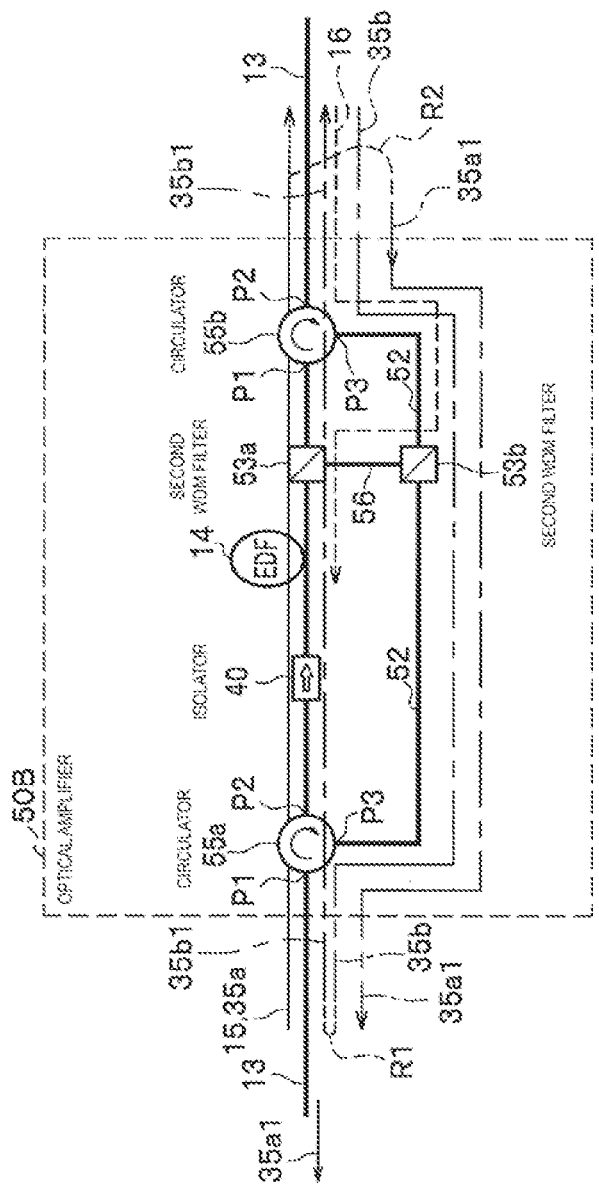
FIG. 4 is a block diagram illustrating a configuration of an optical amplifier according to modification example 2 of the first embodiment.

FIG. 4 is a block diagram illustrating a configuration of an optical amplifier 50B according to modification example 2 of the first embodiment.

The optical amplifier 50B shown in FIG. 4 is different from the optical amplifier 50 (FIG. 2) described above in that the optical amplifier 50B includes circulators 55*a* and 55*b* in place of the first WDM filters 51*a* and 51*b* on the rear side and the front side and further includes the two second WDM filters 53*a* and 53*b* described above.

In the optical amplifier 50B, the one circulator 55*a* is interposed on the front side of the set of the isolators 40 and the EDF 14 in the submarine cable 13, and the other circulator 55*b* is interposed on the rear side. Further, the second WDM filter 53*a* is interposed in the main path 13, with the main port of the second WDM filter 53*a* connected to the main path 13 between the EDF 14 and the circulator 55*b* on the rear side.

Further, the subordinate ports between the front and rear circulators 55*a* and 55*b* are directly connected by the bypass path (the bypass path 52) of the optical cable 52 while bypassing the isolator 40 and the EDF 14. The other second WDM filter 53*b* is interposed in this bypass path 52, with the main port of the second WDM filter 53*b* connected to the bypass path 52. The subordinate ports of both of the second WDM filters 53*a* and 53*b* are directly connected by a bypass path (a bypass path 56) of the optical cable 56.

The circulators 55*a* and 55*b* transmit the signal light of all wavelengths input from one port only in a clockwise direction (only in one rotation direction)(referred to as rotational transmission), as indicated by a clockwise arrow in a circle, and output the signal light from a next port in the clockwise direction. The circulators 55*a* and 55*b* include three ports P1, P2, and P3, with ports connected to the submarine cable 13 being a first port P1 and a second port P2, and a port between the first and second ports P1 and P2 being a third port P3.

The signal light transmitted through the optical amplifier 50B will be described herein. In modification example 2, a wavelength of the OTDR light 35a and 35b is 1.5 μm that is the same wavelength as that of the main signal light 15. In this 1.5 μm, a loss in the optical fiber is the least. A loss at each wavelength is as follows in order of short wavelengths. 1.31 μm (high loss), 1.5 μm (minimum loss), 1.625 μm (medium loss), and 1.65 μm (medium loss).

Thus, the wavelength of the OTDR light 35a and 35b is 1.5 μm as in the main signal light 15, but because the OTDR light 35a and 35b is transmitted when the main signal light 15 is not transmitted due to a fault of the submarine cable 13, the OTDR light 35a and 35b does not interfere with the main signal light 15. The excitation light 16 has a wavelength of 1.48 μm as described above.

An operation of transmitting the signal light in the optical amplifier 50B having such a configuration will be described. First, the excitation light 16 having a wavelength of 1.48 μm transmitted from the excitation light transmission device 34 (FIG. 1) on the rear side is input from the second port P2 of the circulator 55b on the rear side, is rotationally transmitted by the circulator 55b, and is output from the third port P3 to the bypass path 52. The output excitation light 16 is demultiplexed to the bypass path 56 by the one second WDM filters 53b, and is further demultiplexed to the front side of the main path 13 by the other second WDM filter 53a and incident on the EDF 14. This incidence allows the EDF 14 to amplify the main signal light 15.

Next, the main signal light 15 received in the forward direction from the transmission device 11 (FIG. 1) via the submarine cable 13 is input from the first port P1 of the circulator 55a on the front side, rotationally transmitted by the circulator 55a, and output from the second port P2 to the main path 13. This output main signal light 15 is input to the EDF 14 via the isolator 40 and amplified. This amplified main signal light 15 is input from the first port P of the circulator 55b on the rear side via the second WDM filter 53a, rotationally transmitted by the circulator 55b, output from the second port P2 to the submarine cable 13, and transmitted to the reception device 12 (FIG. 1).

Here, when a fault that the reception device 12 cannot receive or cannot appropriately receive the main signal light 15 has occurred, fault measurement of the submarine cable 13 is performed.

At the time of this fault measurement, the excitation light 16 is necessary. Thus, in a case in which the return light 35b1 of the OTDR light 35b transmitted in the reverse direction from the measurement device 32b on the reception side (FIG. 1) is absorbed by the EDF 14 when the return light 35b1 passes through the EDF 14 via the isolator 40, the return light 35b1 cannot be received by the measurement device 32b on the reception side. Thus, it is necessary for the excitation light 16 to be emitted and the return light 35b1 to be amplified by the EDF 14.

In a transmission state of this excitation light 16, the OTDR light 35b from the measurement device 32b on the reception side is input from the second port P2 of the circulator 55b on the rear side, is output from the third port P3 to the bypass path 52, and is demultiplexed into the bypass path 52 on the circulator 55a side on the front side by the second WDM filter 53b. This demultiplexed OTDR light 35b is input from the third port P3 of the circulator 55a on the front side, output from the first port P1, and transmitted to the submarine cable 13 in the reverse direction.

The return light 35b1 reflected in the submarine cable 13 at the time of transmission in the reverse direction and returned in the forward direction to the rear side as indicated by a dashed line R1 passes through the isolator 40 via the circulator 55a on the front side and is amplified by the EDF 14. This amplified return light 35b1 passes through the circulator 55b on the rear side via the second WDM filter 53a, is transmitted to the submarine cable 13, and is received by the measurement device 32b on the reception side. Thus, the fault measurement of the submarine cable 13 is performed as described above in the measurement device 32b.

On the other hand, the OTDR light 35a in the forward direction from the measurement device 32a on the transmission side passes through the isolator 40 via the circulator 55a on the front side, is amplified by the EDF 14, and is transmitted from the circulator 55b on the rear side to the rear side, similar to the main signal light 15 described above. In this case, the return light 35a1 returned in the reverse direction to the front side bypasses the isolator 40 in the bypass path 52 between the circulators 55a and 55b, and is transmitted to the measurement device 32a on the transmission side, as indicated by a dashed line R2. Thus, the amplification as in the return light 35b1 directed in the forward direction is unnecessary for the return light 35a1 directed in the reverse direction.

According to such an optical amplifier 50B, the ASE noise 36b is generated because the excitation light 16 is used, but the optical noise 36b (FIG. 17) generated through reciprocation in the EDF 14 is not generated because there is the isolator 40. Thus, transmission properties are improved without being deteriorated. Further, because the OTDR light 35b from the rear side bypasses the isolator 40, the measurement distance is not limited by the isolator 40.

Further, the power of the return light 35a1 and 35b1 of the OTDR light 35a and 35b transmitted in the opposite directions from both the transmission and reception sides can be maintained as the power that can be appropriately received by the measurement devices 32a and 32b on both the transmission and reception sides. Thus, the fault measurement of the submarine cable 13 can be appropriately performed.

Further, because the wavelength of the OTDR light 35a and 35b can be 1.5 μm as in the main signal light 15, the measurement distance can be extended. Further, because the fault measurement is performed from the measurement devices 32a and 32b on the front side and the rear side, the measurements can be performed in all sections Y5 and Y6 of the submarine cable 13. In the wavelength of the OTDR light 35a and 35b, the measurement distance is shorter than in a 1.5 μm band, but the wavelength may be in a 1.6 μm band.

Modification Example 3 of First Embodiment

Figure 5:
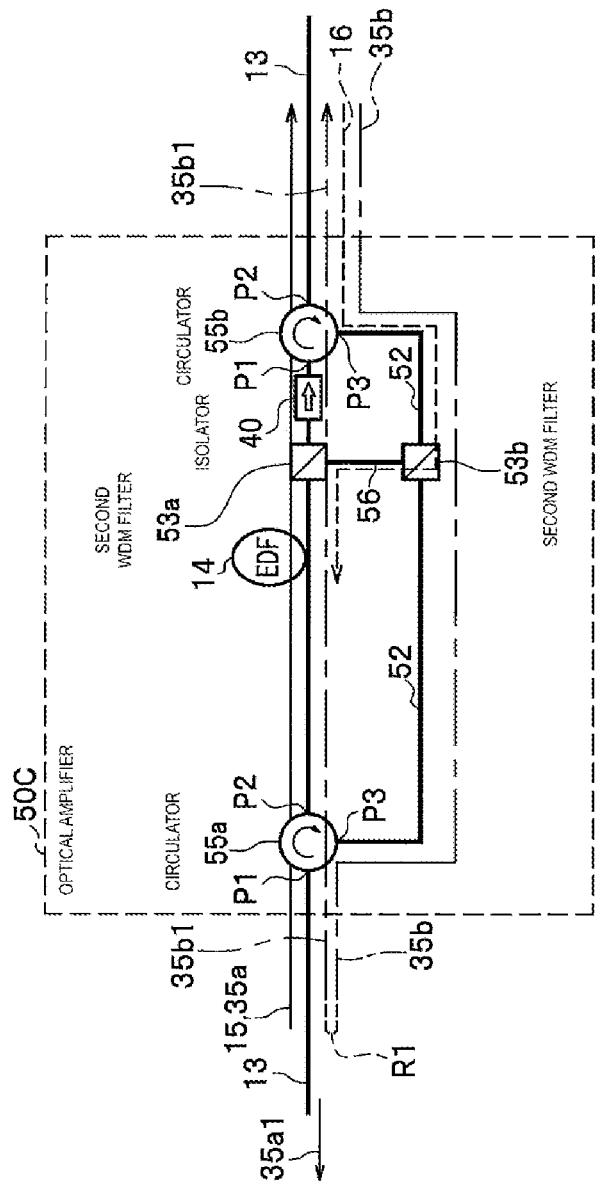
FIG. 5 is a block diagram illustrating a configuration of an optical amplifier according to modification example 3 of the first embodiment.

FIG. 5 is a block diagram illustrating a configuration of an optical amplifier 50C according to modification example 3 of the first embodiment.

The optical amplifier 50C shown in FIG. 5 is different from the optical amplifier 50B (FIG. 4) described above in that the isolator 40 is interposed in the submarine cable 13 between the second WDM filter 53a on the rear side relative to the EDF 14 and the circulator 55b.

In this configuration, the excitation light 16 from the rear side passes through the circulator 55b and the second WDM filters 53b and 53a, bypasses the isolator 40 in the bypass paths 52 and 56, and is input to the EDF 14. The second WDM filters 53a and 53b constitute a second multiplexing/demultiplexing unit described in aspects of the present invention.

In the optical amplifier 50C of modification example 3, the main signal light 15 from the transmission device 11 is directly input to the EDF 14 because the isolator 40 is on the rear stage side of the EDF 14. Thus, because the main signal light 15 is not attenuated before amplification, it is possible to improve OSNR properties and improve transmission properties.

Further, because the OTDR light 35b from the rear side bypasses the isolator 40 at the circulator 55b, the measurement distance is not limited by the isolator 40.

Configuration of Second Embodiment

Figure 6:
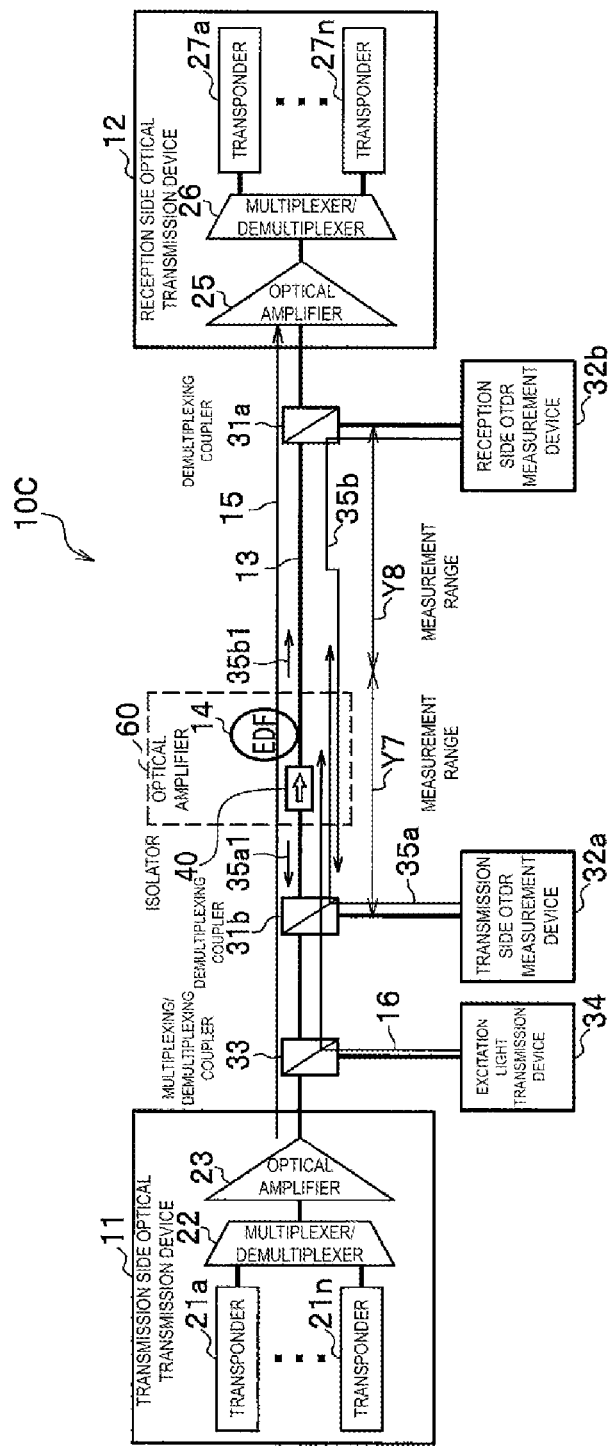
FIG. 6 is a block diagram illustrating a configuration of a front excitation type remote excitation submarine transmission system as an optical transmission system using a remote excitation optical amplifier based on front excitation according to a second embodiment of the present invention.

FIG. 6 is a block diagram illustrating a configuration of a front excitation type remote excitation submarine transmission system (a system) as an optical transmission system using a remote excitation optical amplifier based on front excitation according to a second embodiment of the present invention.

Differences between a system 10C of the second embodiment shown in FIG. 6 and the system 10B (FIG. 1) of the first embodiment will be described. First, the excitation light transmission device 34 is connected to the submarine cable 13 between the transmission device 11 and the measurement device 32a on the transmission side via the multiplexing/demultiplexing coupler 33. Then, an optical amplifier 60 is interposed (disposed) on a side closer to the transmission device 11 relative to a middle of the submarine cable 13.

Figure 7:
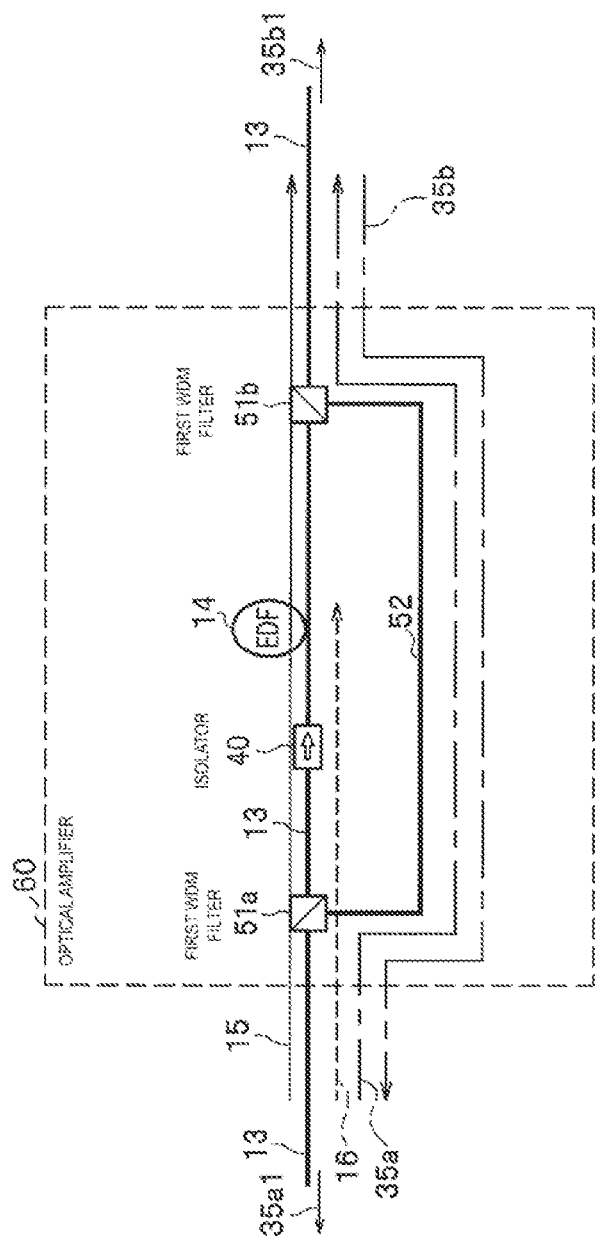
FIG. 7 is a block diagram illustrating a configuration of an optical amplifier used for the remote excitation submarine transmission system of the second embodiment.

As shown in FIG. 7, the optical amplifier 60 is the same configuration as the optical amplifier 50 (FIG. 2), but the excitation light 16 in the forward direction from the excitation light transmission device 34 disposed on the transmission device 11 side is incident on the EDF 14 via the first WDM filter 51a on the front side and the isolator 40 (a front excitation configuration).

The first WDM filters (multiplexing/demultiplexing units) 51a and 51b on both sides of the set of the isolators 40 and the EDF 14 multiplex/demultiplex the main signal light 15 of 1.5 μm as signal light of 1.5 μm or less or the excitation light 16 of the 1.48 μm and transmit the multiplexed/demultiplexed signal light to the main path 13, and multiplex/demultiplex the OTDR light 35a and 35b as signal light of 1.6 μm or more and transmit the multiplexed/demultiplexed signal light to the bypass path 52. Thus, the OTDR light 35a and 35b is transmitted to the submarine cable 13 while bypassing the isolators 40 and the EDF 14.

An operation of measuring a fault location of the submarine cable (optical cable) of the system 10C shown in FIG. 6 using the optical amplifier 60 according to the second embodiment as described above is the same as that described in the first embodiment.

Further, in the system 10C, because the optical amplifier 60 is disposed on aside closer to the transmission device 11 relative to the intermediate portion of the submarine cable 13, a measurement range of a fault of the submarine cable 13 in each of the measurement devices 32a and 32b may be slightly different from that in the system 10B (FIG. 1) of the first embodiment. Therefore, the measurement range of the submarine cable 13 in the measurement device 32a on the transmission side is indicated by an arrow Y7, and the measurement range in the measurement device 32b on the reception side is indicated by an arrow Y8.

Effect of Second Embodiment

Effects of the optical amplifier 60 and effects of the optical transmission system 10C using the optical amplifier 60 according to the second embodiment will be described.

The optical amplifier 60 is interposed in the submarine cable (the optical cable) 13 between the transmission device 11 and the reception device 12 that transmit and receive the main signal light 15. The optical amplifier 60 includes the isolator 40 that passes the main signal light 15 transmitted from the transmission device 11 in only a forward direction (one direction), and the front excitation EDF 14 that amplifies the main signal light 15 in response to the excitation light 16 transmitted in the same direction as the main signal light 15. This optical amplifier 60 has the following characteristic configuration.

The optical amplifier 60 includes the first WDM filters (multiplexing/demultiplexing unit) 51a and 51b that multiplex/demultiplex the OTDR light 35a and 35b transmitted in opposite directions from both the measurement device 32a on the transmission side and the measurement device 32b on the reception sides that detect a fault location of the submarine cable 13 and the main signal light 15 having a wavelength different from those of the OTDR light 35a and 35b, the first WDM filters 51a and 51b being interposed on both sides of the set of the isolators 40 and the EDF 14 in the submarine cable 13. Further, the first WDM filters 51a and 51b on both sides are configured to be connected to each other by the main path 13 of the submarine cable 13 that connects, via the isolators 40 and the EDF 14, their main ports to each other, via which the multiplexed/demultiplexed main signal light 15 is input and output, and by the bypass path 52 of the optical cable 52 that directly connects their subordinate ports to each other, via which the multiplexed/demultiplexed OTDR light 35a is input and output while bypassing the isolators 40 and the EDF 14.

However, the measurement devices 32a and 32b on both the transmission and reception sides transmit the OTDR light 35a and 35b having a wavelength different from that of the main signal light 15 to the submarine cable 13, and receive the return light 35a1 of the transmitted OTDR light 35a and 35b caused by reflection in the submarine cable 13 to detect a fault location of the submarine cable 13.

With this configuration, because the OTDR light 35a and 35b pass through the bypass path 52 between the first WDM filters 51a and 51b on both the sides when a fault such as a disconnection has occurred in the submarine cable 13, the measurement of the fault location is performed without passing through the EDF 14. Thus, the OTDR light 35a and 35b transmitted in the opposite directions from both the transmission and reception sides can reach the intermediate portion of the submarine cable 13 as indicated by arrows Y7 and Y8 in FIG. 6, and it is possible to perform fault measurement in the entire area of the submarine cable 13 without using the excitation light 16.

Further, the ASE noise 36 (FIG. 17) can be prevented from being generated because the excitation light 16 may be unnecessary. Thus, because expensive C-OTDRs are unnecessary as the measurement devices 32a and 32b on both sides and general OTDRs are sufficient, low costs of equipment in the optical transmission system is achieved. Thus, when the optical amplifier 60 is used in the system 10C, it is possible to easily measure and detect the fault location of the submarine cable 13 at a long distance with a low-cost equipment.

Modification Example 1 of Second Embodiment

Figure 8:
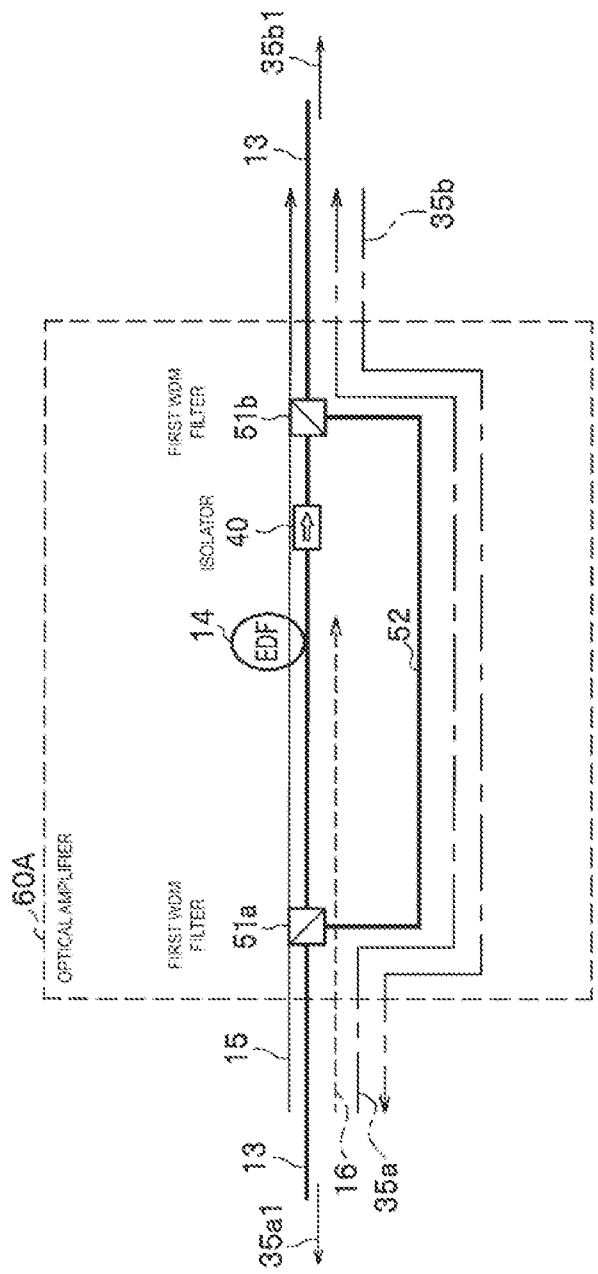
FIG. 8 is a block diagram illustrating a configuration of an optical amplifier according to modification example 1 of the second embodiment.

FIG. 8 is a block diagram illustrating a configuration of an optical amplifier 60A according to modification example 1 of the second embodiment.

The optical amplifier 60A shown in FIG. 8 is different from the optical amplifier 60 (FIG. 7) described above in that an isolator 40 is interposed in the submarine cable 13 between the EDF 14 and the first WDM filter 51b on the rear side.

In the optical amplifier 60A having such a configuration, the excitation light 16 transmitted from the excitation light transmission device 34 (FIG. 6) on the transmission device 11 side is incident on the EDF 14 via the first WDM filter 51a on the front side. This incidence allows the EDF 14 to amplify the main signal light 15.

Here, when a fault has occurred in the submarine cable 13, the main signal light 15 is in a blocked state and the excitation light 16 enters a non-transmitted state. The OTDR light 35a transmitted in the opposite direction from the measurement devices 32a and 32b on both the transmission and reception sides is transmitted to the submarine cable 13 while bypassing the isolators 40 and the EDF 14 by passing through the bypass path 52 between the first WDM filters 51a and 51b.

Thus, the OTDR light 35a and 35b transmitted in the opposite directions from both the transmission and reception sides can reach the intermediate portion of the submarine cable 13 as indicated by arrows Y7 and Y8 in FIG. 6, and it is possible to perform fault measurement in the entire area of the submarine cable 13 without using the excitation light 16.

Further, in the optical amplifier 60A, the main signal light 15 from the transmission device 11 is directly input to the EDF 14 because the isolator 40 is on the reception device 12 side of the EDF 14. Thus, because the main signal light 15 is not attenuated before amplification, it is possible to improve OSNR properties and improve transmission properties.

Modification Example 2 of Second Embodiment

Figure 9:
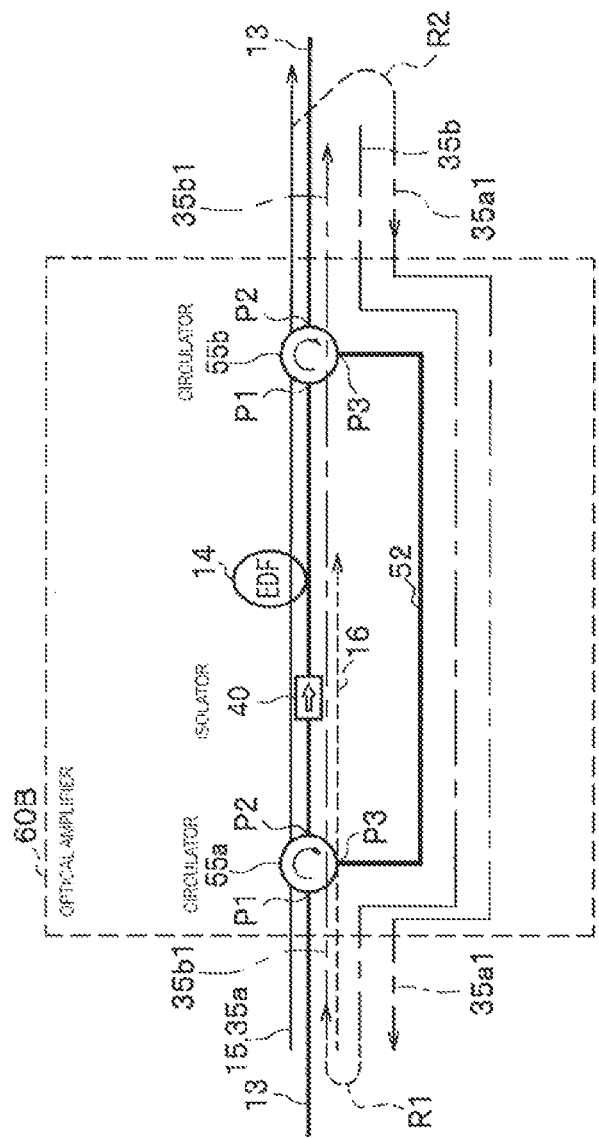
FIG. 9 is a block diagram illustrating a configuration of an optical amplifier according to modification example 2 of the second embodiment.

FIG. 9 is a block diagram illustrating a configuration of an optical amplifier 60B according to modification example 2 of the second embodiment.

The optical amplifier 60B shown in FIG. 9 is different from the optical amplifier 60 (FIG. 7) described above in that the optical amplifier 60B includes circulators 55a and 55b in place of the first WDM filters 51a and 51b on the rear side and the front side. In the circulators 55a and 55b, the second ports P2 and the first ports P1 are connected to the main path 13 in which the isolators 40 and the EDF 14 are interposed in this order, and the third ports P3 are directly connected to the bypass path 52 while bypassing the isolators 40 and the EDF 14.

In modification example 2, a wavelength of the OTDR light 35a and 35b is 1.5 μm that is the same wavelength as that of the main signal light 15 having the lowest loss in an optical fiber as described above. However, because the OTDR light 35a and 35b is transmitted when the main signal light 15 is not transmitted due to a fault of the submarine cable 13, the OTDR light 35a and 35b does not interfere with the main signal light 15. The excitation light 16 has a wavelength of 1.48 μm as described above.

In the optical amplifier 60B having such a configuration, the excitation light 16 with a wavelength of 1.48 μm transmitted from the excitation light transmission device 34 on the front side (FIG. 6) is input from the first port P of the circulator 55a on the front side, rotationally transmitted by the circulator 55b, and output from the second port P2 to the main path 13. The output excitation light 16 is incident on the EDF 14 via the isolator 40. This incidence allows the EDF 14 to amplify the main signal light 15.

The main signal light 15 from the transmission device 11 is then input from the first port P1 of the circulator 55a on the front side and output from the second port P2 to the main path 13. This output main signal light 15 is input to the EDF 14 via the isolator 40 and amplified. This amplified main signal light 15 is input from the first port P1 of the circulator 55b on the rear side, output from the second port P2 to the submarine cable 13, and transmitted to the reception device 12 (FIG. 6).

Here, when a fault has occurred in the submarine cable 13, fault measurement is performed. At the time of this fault measurement, the main signal light 15 is in a blocked state, and thus the excitation light 16 is necessary. The reason is that the return light 35b1 of the OTDR light 35b from the measurement device 32b on the reception side cannot be received by the measurement device 32b on the reception side in a case in which the return light 35b1 is absorbed by the EDF 14 when the return light 35b1 passes through the EDF 14 via the isolator 40 as described above. Thus, it is necessary for the excitation light 16 to be emitted and the return light 35b1 to be amplified by the EDF 14.

The OTDR light 35a from the measurement device 32a on the transmission side passes through the isolator 40 via the circulator 55a on the front side, is amplified by the EDF 14, and is transmitted from the circulator 55b on the rear side to the rear side, similar to the main signal light 15 described above. In this case, the return light 35a1 returned to the front side bypasses the isolator 40 in the bypass path 52 between the circulators 55a and 55b, and is transmitted to the measurement device 32a on the transmission side, as indicated by the dashed line R2. Thus, the amplification as in the return light 35b1 directed to the rear side is unnecessary for the return light 35a1 directed to the front side.

According to such an optical amplifier 60B, even when the excitation light 16 is used, the optical noise 36b generated through reciprocation in the EDF 14 is not generated because there is the isolator 40. Thus, because expensive C-OTDRs are as the measurement devices 32a and 32b on both sides unnecessary and general OTDRs are sufficient, low costs of equipment in the optical transmission system is achieved.

Further, the power of the return light 35a1 and 35b1 of the OTDR light 35a and 35b transmitted in the opposite directions from both the transmission and reception sides can be maintained as the power that can be appropriately received by the measurement devices 32a and 32b on both the transmission and reception sides. Thus, appropriate fault measurement of the submarine cable 13 can be performed.

Modification Example 3 of Second Embodiment

Figure 10:
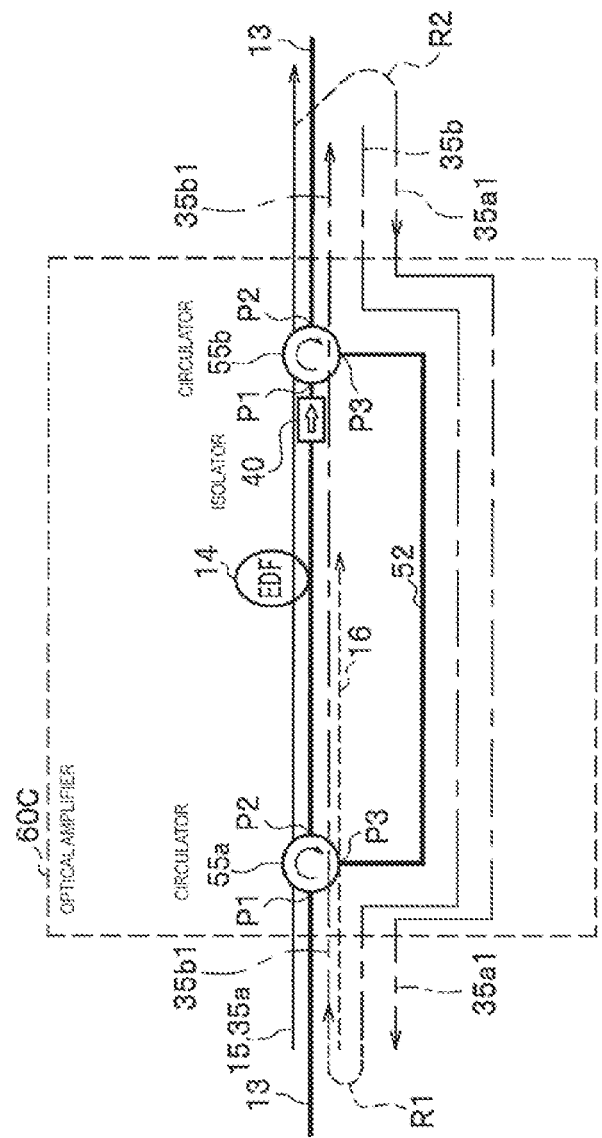
FIG. 10 is a block diagram illustrating a configuration of an optical amplifier according to modification example 3 of the second embodiment.

FIG. 10 is a block diagram illustrating a configuration of an optical amplifier 60C according to modification example 3 of the second embodiment.

The optical amplifier 60C shown in FIG. 10 is different from the optical amplifier 60B (FIG. 8) described above is that the isolator 40 is interposed in the submarine cable 13 between the EDF 14 and the circulator 55b on the rear side.

In the optical amplifier 60C of modification example 3, the main signal light 15 from the transmission device 11 is directly input to the EDF 14 because the isolator 40 is on the reception device 12 side of the EDF 14. Thus, because the main signal light 15 is not attenuated before amplification, it is possible to improve OSNR properties and improve transmission properties.

Configuration of Third Embodiment

Figure 11:
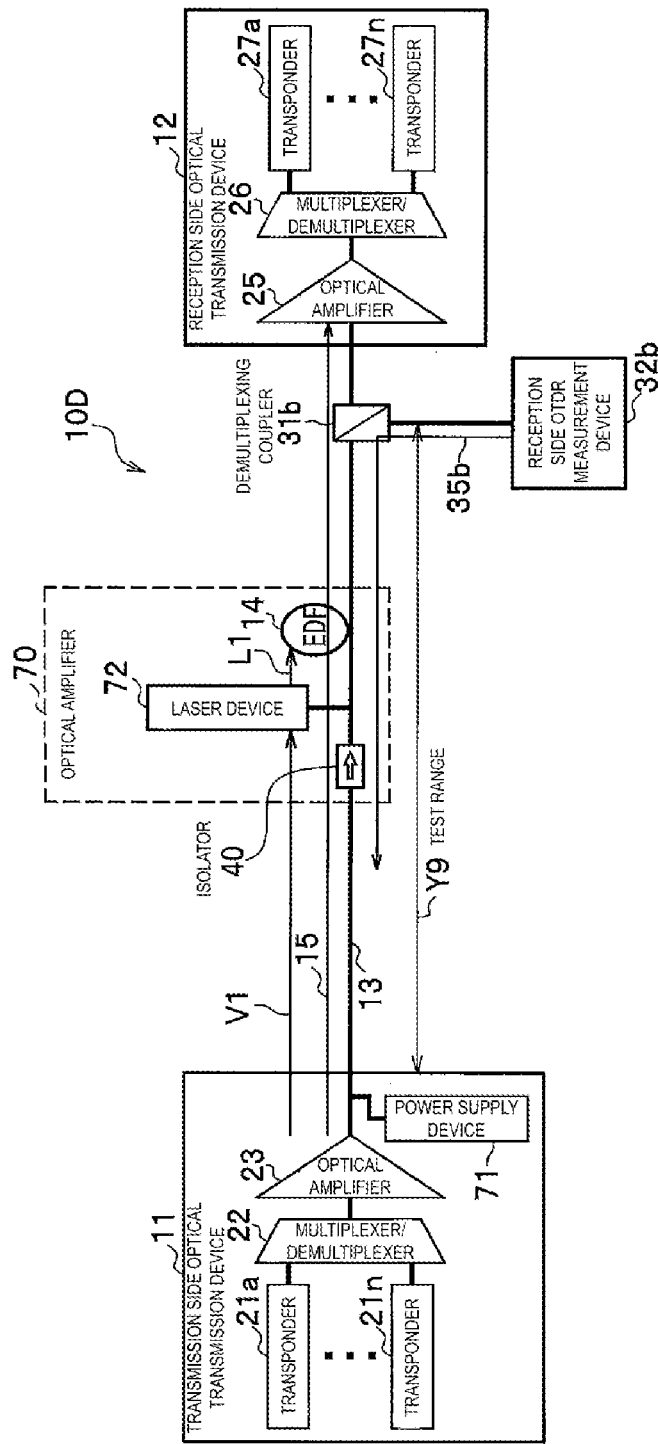
FIG. 11 is a block diagram illustrating a configuration of a submarine transmission system with a repeater as an optical transmission system using an optical amplifier according to a third embodiment of the present invention.

FIG. 11 is a block diagram illustrating a configuration of a submarine transmission system with a repeater (a system) as an optical transmission system using an optical amplifier according to a third embodiment of the present invention.

In a system 10D of the third embodiment shown in FIG. 11, the transmission device 11 and the reception device 12 are connected by the submarine cable 13 based on an optical cable, an optical amplifier 70 as an amplification repeater is interposed in the submarine cable 13, and a measurement device 32b is connected to only the vicinity of the reception device 12 via the demultiplexing coupler 31b.

The transmission device 11 and the reception device 12 include the same components as in the first embodiment, but the transmission device 11 includes a power supply device 71 that supplies a supply voltage.

The submarine cable 13 includes an optical fiber and an electrical wire (a conductive wire) therein, and a voltage (a voltage signal) V1 from the power supply device 71 is transmitted to the electrical wire. The main signal light 15 from the optical amplifier 23 of the transmission device 11 is transmitted to the optical fiber.

The optical amplifier 70 includes the isolator 40 and the EDF 14 with which a laser device 72 is combined. The laser device 72 is connected to the electrical wire of the submarine cable 13, and emits excitation laser light (excitation light) L1 to the EDF 14 when a voltage V1 transmitted via the electrical wire is supplied. The EDF 14 excites erbium ions in an optical fiber core using the emitted excitation laser light L1 and amplifies the main signal light 15.

Figure 12:
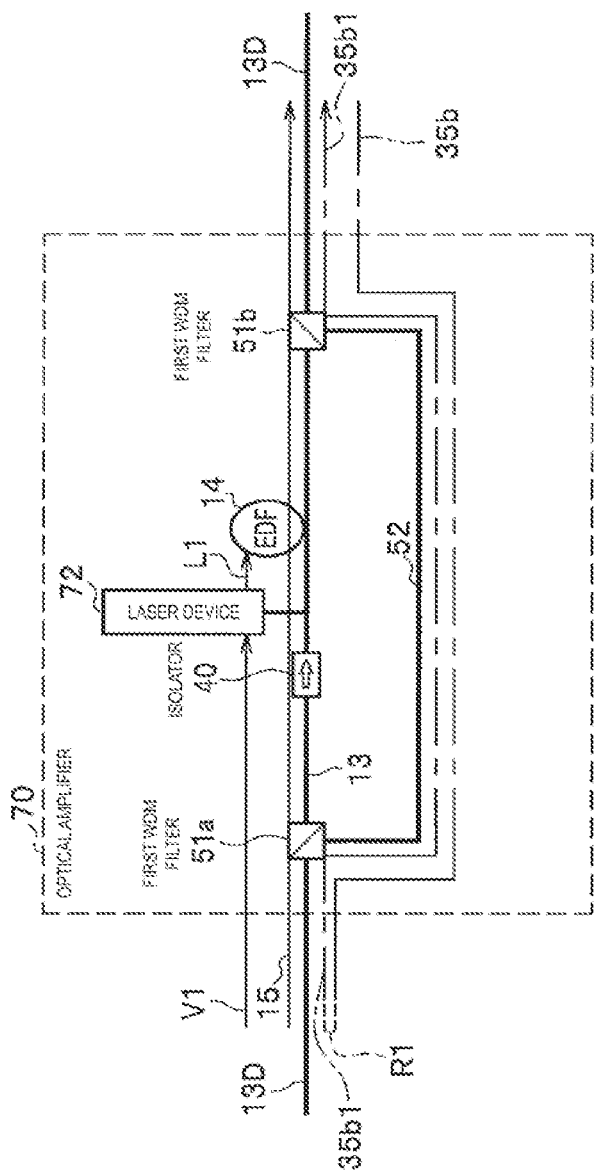
FIG. 12 is a block diagram illustrating a configuration of an optical amplifier used for the remote excitation submarine transmission system of the third embodiment.

The optical amplifier 70 has a configuration in which the first WDM filters (multiplexing/demultiplexing unit) 51a and 51b are interposed in the submarine cable 13 on both sides of a set of the isolators 40, the laser device 72, and the EDF 14, as shown in FIG. 12. The first WDM filters 51a and 51b on both sides multiplex/demultiplex the main signal light 15 with 1.5 μm as signal light having 1.5 μm or less and transmit the multipexed/demultiplexed signal light to the main path 13, and multiplex/demultiplex the OTDR light 35b in the reverse direction as signal light having 1.6 μm or more and transmit the multiplexed/demultiplexed signal light to the bypass path 52. Therefore, the OTDR light 35b is transmitted to the submarine cable 13 while bypassing the isolators 40 and the EDF 14.

When a fault has occurred in the submarine cable 13 of the system 10D using such an optical amplifier 70 and the main signal light 15 has been in a blocked state, the OTDR light 35b is transmitted in the reverse direction from the measurement device 32b on the reception side.

When a fault has occurred in the submarine cable 13, the voltage V1 is also blocked, but the voltage V1 may be transmitted when the electrical wire is normal.

The OTDR light 35b transmitted in the reverse direction is demultiplexed to the bypass path 52 by the first WDM filter 51b on the rear side of the optical amplifier 70, and is transmitted to the submarine cable 13 in the reverse direction via the first WDM filter 51a on the front side while bypassing the EDF 14.

The return light 35b1 reflected in the submarine cable 13 at the time of transmission in the reverse direction and transmitted in the forward direction as indicated by a dashed line R1 bypasses toward the bypass path 52 via the first WDM filter 51a on the front side, is transmitted from the first WDM filter 5b on the rear side to the submarine cable 13, and is received by the measurement device 32b on the reception side. Thus, fault measurement of the submarine cable 13 is performed in the measurement device 32b.

In this configuration, the measurement device 32b is connected to the reception device 12 as shown in FIG. 11, but the fault measurement can be performed in the same manner as described above even when the measurement device 32b is connected to the vicinity of the transmission device 11.

Further, as the transmission device 11 includes the power supply device 71, the reception device 12 may also include the power supply device 71, and the voltage V1 may be transmitted from both the transmission device 11 side and the reception device 12 side to the electrical wire of the submarine cable 13 or the voltage V1 may be transmitted from one of the two sides and supplied to the laser device 72.

Effects of Third Embodiment

Effects of the optical amplifier 70 according to the third embodiment and effects of the system 10D using the optical amplifier 70 will be described.

The optical amplifier 70 includes the isolator 40 that is interposed in the submarine cable 13 as an optical cable that connects the transmission device and the reception devices that transmit and receive the main signal light 15 and passes the main signal light 15 transmitted from the transmission device 11 only in one direction of the forward direction, and the EDF 14 that includes the laser device 72 combined therewith which emits the excitation laser light L1 according to supply of the voltage V1 and amplifies the main signal light 15 according to the excitation laser light L1.

(1) The optical amplifier 70 includes the first WDM filters (multiplexing/demultiplexing units) 51a and 51b that multiplex/demultiplex the main signal light 15 and the OTDR light 35b as measurement light having a wavelength different from that of the main signal light 15 for submarine cable fault measurement transmitted from any one of the transmission device 11 side and the reception device 12 side to the submarine cable 13, the first WDM filters 51a and 51b being interposed on both sides of the set of the isolator 40 and the EDF 14 having the laser device 72 combined therewith of the submarine cable 13.

Further, the first WDM filters 51a and 51b on both sides are configured to be connected to each other by the main path 13 of the submarine cable 13 that connects, via the isolators 40 and the EDF 14, their main ports to each other, via which the multiplexed/demultiplexed main signal light 15 is input and output, and by the bypass path 52 of the optical cable 52 that directly connects their subordinate ports to each other, via which the multiplexed/demultiplexed OTDR light 35a is input and output while bypassing the isolators 40 and the EDF 14.

However, the measurement device 32b in one or both of the transmission and reception sides transmits the OTDR light 35b having a wavelength different from that of the main signal light 15 to the submarine cable 13, and receives the return light 35b1 of the transmitted OTDR light 35b caused by reflection in the submarine cable 13 to detect a fault location of the submarine cable 13.

With this configuration, because the OTDR light 3b passes through the bypass path 52 that bypasses the isolator 40 and the EDF 14 when a fault such as a disconnection has occurred in the submarine cable 13, the measurement of the fault location is performed without passing through the isolator 40 and the EDF 14. Thus, the OTDR light 35b transmitted in the reverse direction can reach the entire area of the submarine cable 13 as indicated by an arrow Y9 in FIG. 11, and it is possible to perform fault measurement in the entire area of the submarine cable 13 without using the excitation light 16.

Thus, when the optical amplifier 70 is used in the system 10D, it is possible to easily measure and detect the fault location of the submarine cable 13 at a long distance with a low-cost equipment.

Modification Example 1 of Third Embodiment

Figure 13:
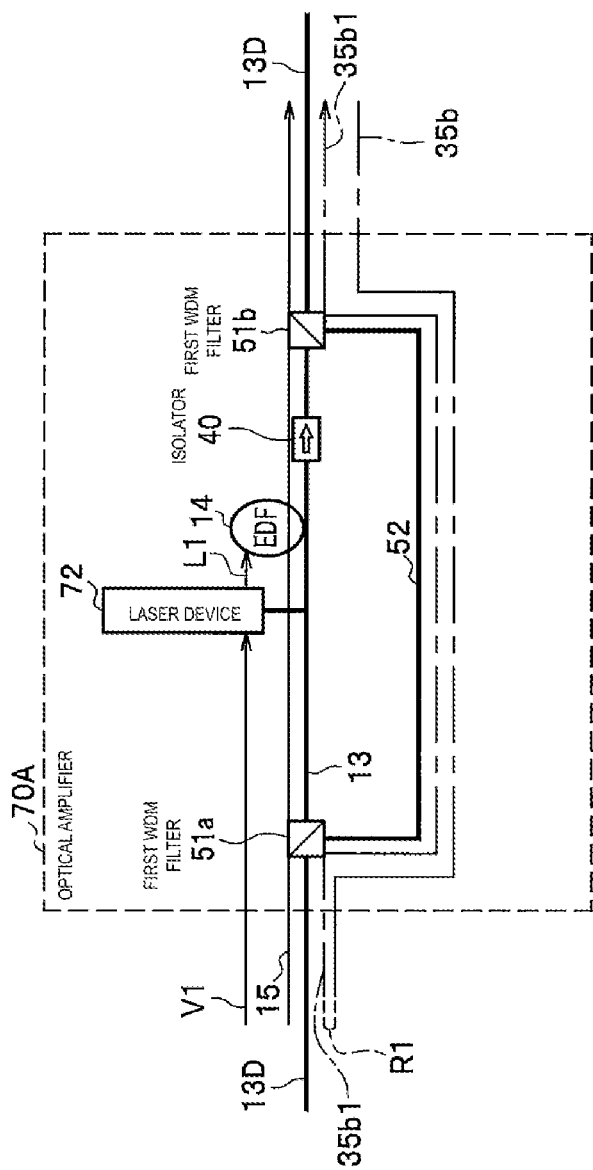
FIG. 13 is a block diagram illustrating a configuration of an optical amplifier according to modification example 1 of the third embodiment.

FIG. 13 is a block diagram illustrating a configuration of an optical amplifier 70A according to modification example 1 of the third embodiment.

The optical amplifier 70A shown in FIG. 13 is different from the optical amplifier 70 (FIG. 12) described above in that an isolator 40 is interposed in the submarine cable 13 between the EDF 14 and the first WDM filter 51b on the rear side.

In the optical amplifier 70A having such a configuration, the main signal light 15 from the transmission device 11 is directly input to the EDF 14 because the isolator 40 is on the reception device 12 side of the EDF 14. Thus, because the main signal light 15 is not attenuated before amplification, it is possible to improve OSNR properties and improve transmission properties.

Modification Example 2 of Third Embodiment

Figure 14:
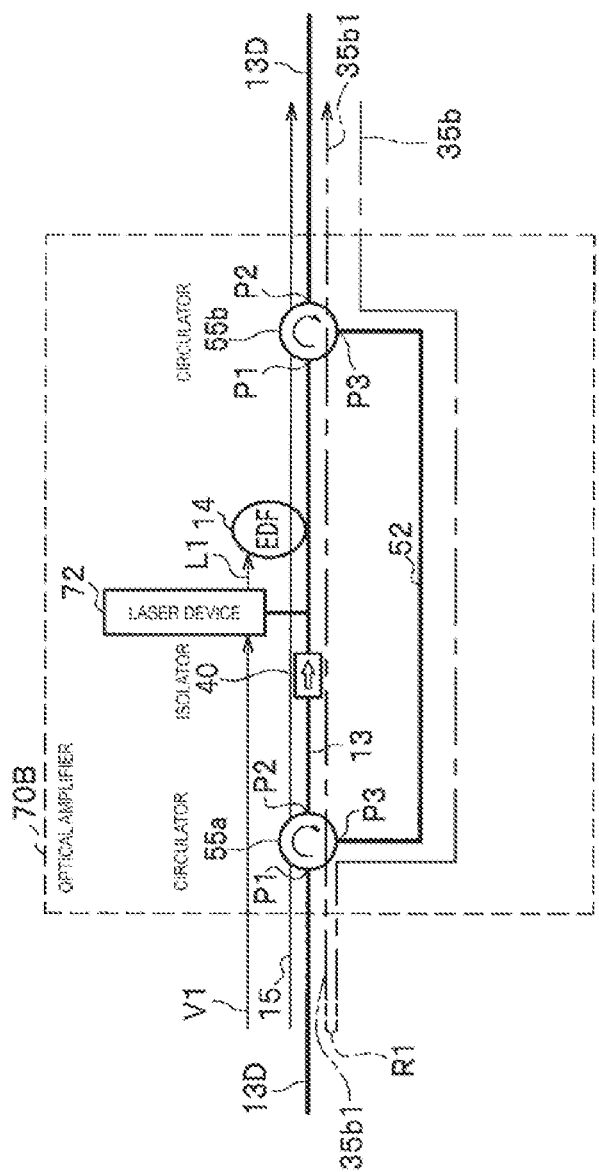
FIG. 14 is a block diagram illustrating a configuration of an optical amplifier according to modification example 2 of the third embodiment.

FIG. 14 is a block diagram illustrating a configuration of an optical amplifier 70B according to modification example 2 of the third embodiment.

The optical amplifier 70B shown in FIG. 14 is different from the optical amplifier 70 (FIG. 12) described above in that the optical amplifier 70B includes circulators 55a and 55b in place of the first WDM filters 51a and 51b on the rear side and the front side. In the circulators 55a and 55b, the second ports P2 and the first ports P1 are connected to the main path 13 in which the isolators 40 and the EDF 14 having the laser device 72 combined therewith are interposed in this order, and the third ports P3 are directly connected to the bypass path 52 while bypassing the isolators 40 and the EDF 14.

In modification example 2, a wavelength of the OTDR light 35b is 1.5 μm that is the same wavelength as that of the main signal light 15 having the lowest loss in an optical fiber as described above.

The main signal light 15 from the transmission device 11 is input from the first port P1 of the circulator 55a on the front side and output from the second port P2 to the main path 13. This output main signal light 15 is input to the EDF 14 via the isolator 40 and amplified. This amplified main signal light 15 is input from the first port P1 of the circulator 55b on the rear side, output from the second port P2 to the submarine cable 13, and transmitted to the reception device 12 (FIG. 6).

When a fault has occurred in the submarine cable 13, the OTDR light 35b is transmitted in the reverse direction from the measurement device 32b on the reception side. The OTDR light 35b transmitted in the reverse direction is input from the second port P2 of the circulator 55b on the rear side of the optical amplifier 70 and is demultiplexed from the third port P to the bypass path 52. This demultiplexed OTDR light 35b is transmitted to the submarine cable 13 in the reverse direction via the ports P3 and P1 of the circulator 55a on the front side while bypassing the isolators 40 and the EDF 14.

The return light 35b1 reflected in the submarine cable 13 at the time of transmission in the reverse direction and transmitted in the forward direction as indicated by the dashed line R1 is input to the optical amplifier 70B. This input return light 35b1 passes through the isolator 40 of the main path 13 via the circulator 55a on the front side, is transmitted from the isolator 40b on the rear side to the submarine cable 13, and is received by the measurement device 32b. Thus, fault measurement of the submarine cable 13 is performed in the measurement device 32b.

According to such an optical amplifier 70B, because the OTDR light 35b passes through the bypass path 52 that bypasses the isolator 40 and the EDF 14 when a fault such as a disconnection has occurred in the submarine cable 13, the OTDR light 35b is transmitted to the submarine cable 13 in the reverse direction without passing through the isolator 40 and the EDF 14. Thus, attenuation of the OTDR light 35b is curbed, the OTDR light 35b reaches the entire area of the submarine cable 13 as indicated by the arrow Y9 in FIG. 11, and it is possible to perform fault measurement in the entire area.

Modification Example 3 of Third Embodiment

Figure 15:
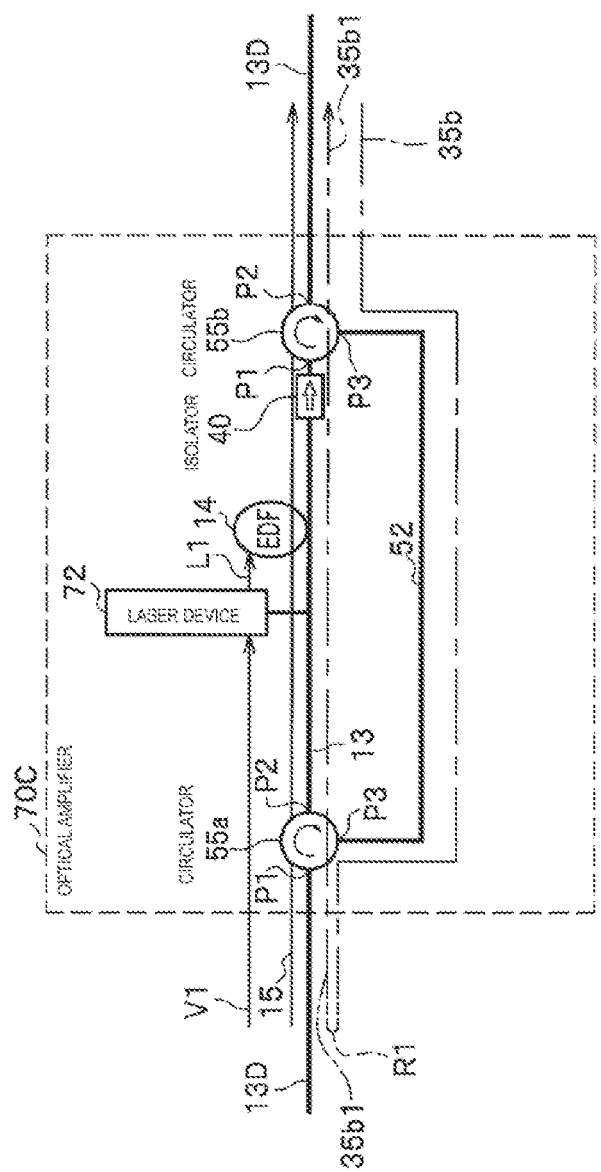
FIG. 15 is a block diagram illustrating a configuration of an optical amplifier according to modification example 3 of the third embodiment.

FIG. 15 is a block diagram illustrating a configuration of an optical amplifier 70C according to modification example 3 of the third embodiment.

The optical amplifier 70C shown in FIG. 15 is different from the optical amplifier 70B (FIG. 14) described above in that the isolator 40 is interposed in the submarine cable 13 between the EDF 14 and the circulator 55b on the rear side.

In the optical amplifier 70C of modification example 3, the main signal light 15 from the transmission device 11 is directly input to the EDF 14 because the isolator 40 is on the reception device 12 side of the EDF 14. Thus, because the main signal light 15 is not attenuated before amplification, it is possible to improve OSNR properties and improve transmission properties.

In addition, a specific configuration can be changed as appropriate without departing from the spirit of the present invention.

REFERENCE SIGNS LIST 10B, 10C Remote excitation submarine transmission system (optical transmission system)
10D Submarine transmission system with repeater (optical transmission system)
11 Transmission side optical transmission device (transmission device)
12 Optical transmission device on reception side (reception device)
13 Submarine cable (main path)
14 EDF
15 Main signal light
16 Excitation light
21a to 21n, 27a to 27n Transponder
22, 26 Multiplexer/demultiplexer
23, 25 Optical amplifier
31a, 31b Demultiplexing coupler
32a and 32b OTDR measurement device (measurement device)
33 Multiplexing/demultiplexing coupler
34 Excitation light transmission device
35a, 35b OTDR light
35a1, 35b1 Return light
40 Isolator 50, 50A, 50B, 50C, 60, 60A. 60B, 60C, 70, 70A, 70B, 70C Optical amplifier
51a and 51b First WDM filter (multiplexing/demultiplexing unit)
52, 54 Other optical cable (bypass path)
53a, 53b Second WDM filter
55a. 55b Circulator
71 Power supply device
72 Laser device
V1 Voltage
L1 Excitation laser light

The invention claimed is:

1. An optical amplifier interposed in an optical cable between a transmission device and a reception device that transmit and receive main signal light and including an isolator configured to pass the main signal light transmitted from the transmission device only in one direction toward the reception device, and an erbium-doped fiber (EDF) configured to amplify the main signal light in response to excitation light, the optical amplifier comprising:
a multiplexing/demultiplexing unit on both sides of a set of the isolator and the EDF in the optical cable, the multiplexing/demultiplexing unit multiplexing/demultiplexing the main signal light and measurement light for optical cable fault measurement transmitted from at least one of a front side as a transmission device side and a rear side as a reception device side to the optical cable, transmitting the multiplexed/demultiplexed main signal light to a main path passing through the isolator and the EDF, and transmitting the multiplexed/demultiplexed measurement light to a bypass path bypassing the isolator and the EDF,
wherein the measurement light comprises i) a first measurement light transmitted by a first measurement device located on the front side with a first measurement range from the front side to an intermediate portion of the optical cable and ii) a second measurement light transmitted by a second measurement device located on the rear side with a second measurement range from the rear side to the intermediate portion of the optical cable, wherein the first measurement range and the second measurement range a) do not overlap, and b) cover an entire area of the optical cable when combined, and
wherein both the first measurement range and the second measurement range vary depending on at least a location of the isolator and the EDF.

2. The optical amplifier according to claim 1, wherein the multiplexing/demultiplexing unit is a wavelength division multiplexing (WDM) filter configured to multiplex/demultiplex the main signal light and the measurement light having different wavelengths, transmit the main signal light after multiplexing/demultiplexing to the main path, and transmit the measurement light to the bypass path.

3. The optical amplifier according to claim 1, wherein the multiplexing/demultiplexing unit includes a circulator configured to transmit the main signal light or the measurement light from the front side to the rear side via the main path, and transmit the measurement light from the rear side to the front side via the bypass path.

4. The optical amplifier according to claim 3, wherein the measurement light has a wavelength that is the same as or different from the wavelength of the main signal light.

5. The optical amplifier according to claim 1, wherein the isolator is disposed on the front side or the rear side of the EDF.

6. The optical amplifier according to claim 5, further comprising:
a second multiplexing/demultiplexing unit configured to input the excitation light from the rear side to the EDF while bypassing the isolator when the isolator is disposed on the rear side of the EDF.

7. An optical transmission system in which a measurement device that transmits measurement light for performing fault measurement of an optical cable between a transmission device and a reception device that transmit and receive main signal light is included on both sides or any one of the sides of the transmission device and the reception device and connected to the optical cable,
an optical amplifier is interposed in an optical cable between the measurement devices included on both sides of the transmission device and the reception device or an optical cable between the transmission device included on any one of both the sides and the transmission device or the reception device, the optical amplifier including an isolator configured to pass the main signal light transmitted from the transmission device only in one direction toward the reception device, and an erbium-doped fiber (EDF) configured to amplify the main signal light in response to excitation light, the optical amplifier comprising:
a multiplexing/demultiplexing unit on both sides of a set of the isolator and the EDF in the optical cable, the multiplexing/demultiplexing unit multiplexing/demultiplexing the main signal light and measurement light for optical cable fault measurement transmitted from at least one of a front side as a transmission device side and a rear side as a reception device side to the optical cable, transmitting the multiplexed/demultiplexed main signal light to a main path passing through the isolator and the EDF, and transmitting the multiplexed/demultiplexed measurement light to a bypass path bypassing the isolator and the EDF,
wherein the measurement light comprises i) a first measurement light transmitted by a first measurement device located on the front side with a first measurement range from the front side to an intermediate portion of the optical cable and ii) a second measurement light transmitted by a second measurement device located on the rear side with a second measurement range from the rear side to the intermediate portion of the optical cable, wherein the first measurement range and the second measurement range a) do not overlap, and b) cover an entire area of the optical cable when combined, and
wherein both the first measurement range and the second measurement range vary depending on at least a location of the isolator and the EDF.

8. The optical transmission system according to claim 7, wherein the multiplexing/demultiplexing unit is a wavelength division multiplexing (WDM) filter configured to multiplex/demultiplex the main signal light and the measurement light having different wavelengths, transmit the main signal light after multiplexing/demultiplexing to the main path, and transmit the measurement light to the bypass path.

9. The optical transmission system according to claim 7, wherein the multiplexing/demultiplexing unit includes a circulator configured to transmit the main signal light or the measurement light from the front side to the rear side via the main path, and transmit the measurement light from the rear side to the front side via the bypass path.

10. The optical transmission system according to claim 9, wherein the measurement light has a wavelength that is the same as or different from the wavelength of the main signal light.

11. The optical transmission system according to claim 7, wherein the isolator is disposed on the front side or the rear side of the EDF.

12. The optical amplifier according to claim 11, wherein the optical amplifier further comprises:
a second multiplexing/demultiplexing unit configured to input the excitation light from the rear side to the EDF while bypassing the isolator when the isolator is disposed on the rear side of the EDF.

13. An optical cable fault location measurement method using an optical transmission system for inserting an optical amplifier in an optical cable between a transmission device and a reception device that transmit and receive main signal light, the optical amplifier including an isolator configured to pass the main signal light transmitted from the transmission device only in one direction toward the reception device, and an erbium-doped fiber (EDF) configured to amplify the main signal light in response to excitation light, and transmitting measurement light from a first measurement device on a front side and a second measurement device on a rear side for optical cable fault measurement to measure a fault of the optical cable,
wherein a multiplexing/demultiplexing unit configured to multiplex/demultiplex the main signal light and the measurement light, transmit the multiplexed/demultiplexed main signal light to a main path passing through the optical amplifier, and transmit the multiplexed/demultiplexed measurement light to a bypass path bypassing the optical amplifier is included on both sides of the optical amplifier of the optical cable,
wherein the measurement light comprises i) a first measurement light transmitted by the first measurement device located on the front side with a first measurement range from the front side to an intermediate portion of the optical cable and ii) a second measurement light transmitted by the second measurement device located on the rear side with a second measurement range from the rear side to the intermediate portion of the optical cable, wherein the first measurement range and the second measurement range a) do not overlap, and b) cover an entire area of the optical cable when combined, and
wherein both the first measurement range and the second measurement range vary depending on at least a location of the isolator and the EDF, and
the first and second measurement devices execute transmitting the measurement light to the optical cable so that the measurement light passes through the bypass path via the multiplexing/demultiplexing unit when the main signal light is unable to be received by the reception device.

14. The optical cable fault location measurement method according to claim 13, wherein the multiplexing/demultiplexing unit is a wavelength division multiplexing (WDM) filter configured to multiplex/demultiplex the main signal light and the measurement light having different wavelengths, transmit the main signal light after multiplexing/demultiplexing to the main path, and transmit the measurement light to the bypass path.

15. The optical cable fault location measurement method according to claim 13, wherein the multiplexing/demultiplexing unit includes a circulator configured to transmit the main signal light or the measurement light from the front side to the rear side via the main path, and transmit the measurement light from the rear side to the front side via the bypass path.

16. The optical cable fault location measurement method according to claim 15, wherein the measurement light has a wavelength that is the same as or different from the wavelength of the main signal light.

17. The optical cable fault location measurement method according to claim 13, wherein the isolator is disposed on the front side or the rear side of the EDF.

18. The optical cable fault location measurement method according to claim 17, wherein the optical amplifier further comprises:
a second multiplexing/demultiplexing unit configured to input the excitation light from the rear side to the EDF while bypassing the isolator when the isolator is disposed on the rear side of the EDF.

* * * * *